United States Patent
Nakasuji et al.

(10) Patent No.: US 6,592,430 B1
(45) Date of Patent: Jul. 15, 2003

(54) HIGH-PRECISION MACHINING SYSTEM

(75) Inventors: Tomoaki Nakasuji, Tokyo (JP);
Masahiko Hasegawa, Tokyo (JP);
Yoshinori Hirai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 112 days.

(21) Appl. No.: 09/672,974

(22) Filed: Sep. 29, 2000

(51) Int. Cl.⁷ .................................................. B24B 1/00
(52) U.S. Cl. .............................. 451/9; 451/10; 451/11; 451/215; 451/221
(58) Field of Search .......................... 451/5, 9, 10, 11, 451/57, 58, 212, 213, 214, 215, 218, 221

(56) References Cited

U.S. PATENT DOCUMENTS

| | | | |
|---|---|---|---|
| 4,794,736 A | * | 1/1989 | Fuwa et al. .................. 451/5 |
| 5,660,511 A | | 8/1997 | Garnett et al. |
| 5,738,564 A | * | 4/1998 | Helle et al. .................. 451/11 |
| 6,224,462 B1 | * | 5/2001 | Yokoyama et al. .......... 451/10 |
| 6,290,571 B1 | * | 9/2001 | Dilger et al. ................. 451/5 |

FOREIGN PATENT DOCUMENTS

| | | |
|---|---|---|
| JP | 61-252064 | 11/1986 |
| JP | 62-166955 | 7/1987 |
| JP | 01-240267 | 9/1989 |
| JP | 08-318418 | 12/1996 |

* cited by examiner

*Primary Examiner*—Eileen P. Morgan
(74) *Attorney, Agent, or Firm*—Burns, Doane, Swecker & Mathis, LLP

(57) ABSTRACT

A rotation axis of a work spindle and a rotation axis of a spindle primary-axis portion are rotated relative to each other and feeding of a work-piece to a tool is accordingly adjusted, whereby warpage of the tool in accordance with a change in machining condition is corrected. A revolution volume of the relative rotation is compared and calculated in process based on data entered in advance, a result of measurement by a displacement sensor and information such as a machining position, and controlled in real time until the end of machining. The relative rotation is driven by an actuator such as a piezoelectric element, at a resolution even as fine as in seconds. The data entered in advance can be sequentially updated in accordance with monitoring of a processed product.

26 Claims, 21 Drawing Sheets

(A)

(B)

HIGH-PRECISION MACHINING SYSTEM

FIELD OF THE INVENTION

The present invention relates to a machining apparatus for machining various types of configurations (e.g., angles, surfaces, and cylinders) into a work-piece with a high precision in a short period of time. In particular, the present invention relates to a machining apparatus which comprises means for correcting distortion (such as warping) of a tool caused by a cutting resistance or grinding resistance during the machining of a curved surface of a scroll blade or a scroll wrap used in a scroll compressor. Also, the present invention relates to an internal machining apparatus which comprises means for correcting deflection (e.g., warping) of a tool and which is usable, in particular, for internal cylindrical grinding of a long hole requiring a precise cylindricality and linearity.

BACKGROUND OF THE INVENTION

Conventionally, a scroll blade used in a scroll compressor has been manufactured by a machining center. However, at present scroll blades are machined by a method called simultaneous bi-axial machining in which a cutting tool is linearly moved along an involute reference curve as a work-piece is rotated. Japanese Patent Application Laid-Open Publication Nos. 6-028812 and 2-41847, for instance, disclose examples of such simultaneous bi-axial machining.

In cutting an elongated hole in a work-piece, a central axis of the hole is aligned to a work-piece rotation axis of a grinder while the work-piece is rotated about the work-piece rotation axis. At this stage, a grindstone is rotated at a high speed through a shaft of the grindstone and a spindle rotor. Next, the work-piece is ground by moving the grindstone radially outwardly of the hole. Simultaneously with this, the grindstone is moved along the rotation axis.

Meanwhile, not only in the machining with the machining center but also in the simultaneous bi-axial machining, the tool is supported at its one end away from its cutting edge. Then, the machining of the curved surface in the scroll blade for the scroll compressor causes the tool to deflect or bend when the cutting edge is subjected to a cutting resistance or grinding resistance. The deflection deviates the cutting edge of the tool from a cutting or grinding position on the involute, which in turn changes an angle of the curved surface of the scroll blade to a reference axis. In addition, not only the tool but also the work-piece or the scroll blade tend to deflect due to the cutting or grinding resistance, which causes deterioration in the precision of the machining.

To overcome those problems, the inventor of the present invention discloses, in Japanese Patent Application Laid-Open Publication No. 5-57518, a technique in which the displacement of the cutting edge is calculated in advance and then the cutting edge of the tool is configuration so that the displacement of the cutting edge relative to the work-piece cancels the displacement.

However, the curved surface of the scroll blade has a different radius of curvature depending on a place. Therefore, the deflections of the tool and the work-piece during machining of the curved surface of the scroll blade change in accordance with a position being machined. In view of the deflection of the work-piece, the work-piece tends to cause less deflection at the machining of the central portion with the smaller radius of curvature while it causes larger deflection at the machining of the peripheral portion with the larger radius of curvature. However, in view of the deflection of the tool, the deflection of the tool at the machining of the radially inwardly faced surface of the scroll blade advances in a direction that is opposite to that at the machining of the radially outwardly faced surface thereof.

Therefore, the machining of the radially inwardly faced surface of the central portion of the scroll compressor forms an enlarged length of the contact region of the tool and the work-piece, which causes an enhanced machining resistance and deflection of the tool. Also, as the machining position moves radially outwardly, the contact length decreases to reduce the deflection. Contrary to this, the machining of the radially outwardly faced surface of the scroll blade forms a reduced length of the contact region between the tool and the work-piece, which causes a reduced machining resistance and deflection of the tool. In view of above, ideally tool configuration changes according to the position of scroll blade to be machined.

In order to increase the machining precision only, the tool may be moved slowly relative to the work-piece or, as described in the Japanese Patent Laid-Open Publication No. 2-41846, the contact region between the work-piece and the tool may be extended to reduce the rotational velocity of the work-piece. However, this results in an extension of the machining time and an deterioration of the working efficiency.

Meanwhile, Japanese Patent Laid-Open Publication No. 8-318418 describes a drive system which includes a cam and a cam follower, where the cam is driven by a servo motor so that a flexible trunnion is distorted to rotate a spindle gauge. This drive system, however, due to a reduced rigidity of the trunnion, is considered unsuitable for the high-speed machining.

On the other hand, for the internal grinding of the hole, since a shaft of a grindstone is extremely long, the hole assumes a taper so that an inner diameter thereof decreases as the hole advances inwardly, which deteriorates the configuration precision in terms of cylindricality and linearity. To overcome this, another technique in which the axis of the grindstone or work-piece is intentionally tilted to offset the deflection of the tool is disclosed in Japanese Patent Laid-Open Publication Nos. 61-252064 and 62-166955, for example. However, this technique has a drawback in a responsibility and a resolution for an angle adjustment of the spindle during traversing. Another technique is disclosed in Japanese Patent Application Laid-Open Publication No. 1-240267, in which the spindle rotor axis is tilted by the use of a magnetic bearing, which is considerably costly.

SUMMARY

The present invention has been made to solve the problems above. Means to solve the problems are as described below.

More specifically, according to a first aspect of the present invention, in a machining system for machining an internal surface of a work-piece, with respect to four axes in total which are a Z-axis in the direction of depth of an internal wall of the work-piece, an X-axis perpendicular to the Z-axis and in the direction for feeding the tool, a Y-axis perpendicular to the Z-axis and the X-axis, and a work-piece C-axis parallel to the Z-axis, the work-piece and the tool are movable relative to each other about at least two axes of the X-axis and the Z-axis, the relative movement between the work-piece and the tool can be corrected simultaneously with respect to the two axes, a rotation axis of the work spindle and a rotation axis of the spindle primary-axis portion can rotate relative to each other at a resolution even as fine as in seconds (angles) to thereby correct a machining error created as a machining condition changes, and a central axis of the relative rotation does not move relative to a machining point even when the work-piece and the tool move relative to each other under machining.

According to other aspect of the present invention, in the machining system, relative rotation between the work-piece and the rotation axis of the spindle primary-axis portion for correction of the machining error may be relative rotation about two axes, an A-axis parallel to the X-axis and a B-axis parallel to the Y-axis.

According to other aspect of the present invention, in the machining system, it is preferable that of the relative rotation about the two axes of the A-axis and the B-axis, the work-piece is driven in the relative rotation about one of the two axes, while the spindle primary-axis portion is driven in the relative rotation about the other one of the two axes.

According to a different aspect of the present invention, in a machining system for machining a scroll blade, with respect to mutually perpendicular three axes in total which are a Z-axis in the direction of depth of a vortex, an X-axis perpendicular to the Z-axis and in the direction for feeding the tool, and a Y-axis perpendicular to the Z-axis and the X-axis, the work-piece and the tool are movable relative to each other about at least the X-axis and the Z-axis, it is possible to simultaneously control movements about at least the two axes, which are relative movement in the direction of the X-axis and rotation about a C-axis (an axis parallel to the Z-axis) which is an axis of the work-piece, a rotation axis of the work spindle and a rotation axis of the spindle primary-axis portion can rotate relative to each other at a resolution even as fine as in seconds (angles) to thereby correct a machining error created as a machining condition changes, and a B-axis (an axis parallel to the Y-axis), the center of the relative rotation, does not move relative to a machining point even when the work-piece and the tool move relative to each other under machining.

According to a yet different aspect of the present invention, in a machining system for internal grinding an internal surface of a work-piece by means of traversing in the direction of a Z-axis, an axis of a cylinder of the work-piece, and by means of feeding in the direction of an X-axis perpendicular to the Z-axis and in a radius direction of the cylinder, a rotation axis of the work spindle and a rotation axis of the spindle primary-axis portion can rotate relative to each other at a resolution even as fine as in seconds (angles) to thereby correct a machining error created as a machining condition changes, and a B-axis, the center of the relative rotation, does not move relative to a machining point even when the work-piece and the tool move relative to each other under machining.

According to other aspect of the present invention, the machining system preferably comprises a rotation guide disposed between a primary-axis base where the spindle primary-axis portion is fixed and a base plate supporting the primary-axis base, and supporting the primary-axis base so as to rotate about the B-axis; an actuator providing rotational drive force to the primary-axis base supported by the rotation guide; a sensor monitoring a revolution volume about the B-axis; a data storage portion including a reference value of the revolution volume; and a feedback circuit controlling the revolution volume based on data included in the data storage portion.

According to other aspect of the present invention, in the machining system, the actuator providing the rotational drive force to the spindle primary-axis base may be a piezoelectric element, a magnetostrictive element, a feed screw mechanism driven by rotation of a motor, or a cam mechanism driving and rotating with a motor.

According to other aspect of the present invention, in the machining system, it is preferable that the data storage portion including the reference value of the revolution volume includes one among a machining error correction volume, i.e., a revolution volume about the B-axis, at each machining position, a revolution volume about the B-axis after an elapsed time since the start of each machining, an amount of distortion of the tool corresponding to a motor current of the spindle primary-axis portion and a corresponding revolution volume about the B-axis, an amount of distortion of the tool corresponding to an angle of twist of the tool or the rotation axis of the spindle primary-axis portion and a corresponding revolution volume about the B-axis, and an amount of distortion of the tool corresponding to power of the spindle primary-axis portion and a corresponding revolution volume about the B-axis, and that such data are compared with data entered in process and calculated to thereby control a revolution volume of relative rotation between the rotation axis of the work spindle and the rotation axis of the spindle primary-axis portion.

According to other aspect of the present invention, in the machining system, it is preferable that the work-piece processed based on the comparison with the data included in the data storage portion is measured at a predetermined frequency, and the data included in the data storage portion are updated sequentially based on a result of the measurement.

According to other aspect of the present invention, the machining system further comprises means for correcting relative rotation about B-axis between the rotation axis of the work spindle and the rotation axis of the spindle primary-axis portion and additionally for correcting an error in the direction of the X-axis caused by displacement of the center of the rotation about the B-axis from the spindle primary-axis portion, for the purpose of correcting warping of the tool due to the machining resistance.

According to other aspect of the present invention, in the machining system, the central axis of the relative rotation about the B-axis between the rotation axis of the work spindle and the rotation axis of the spindle primary-axis portion is arranged preferably on a machining point group or offset from the machining point group by an amount within the radius of the tool.

According to other aspect of the present invention, in the machining system, a direction in which the rotational drive force during the relative rotation about the B-axis between the rotation axis of the work spindle and the rotation axis of the spindle primary-axis portion is transmitted may be the direction of a tangential line to a circle about the B-axis.

According to other aspect of the present invention, in the machining system, it is preferable that the mechanism driving and controlling the relative rotation about the B-axis between the rotation axis of the work spindle and the rotation axis of the spindle primary-axis portion is disposed to a work-piece base seating the work spindle, and the rotation axis of the work spindle is rotated about the B-axis relative to the rotation axis of the spindle primary-axis portion.

PREFERRED EMBODIMENTS OF THE PRESENT INVENTION

First Embodiment

Figure 1:
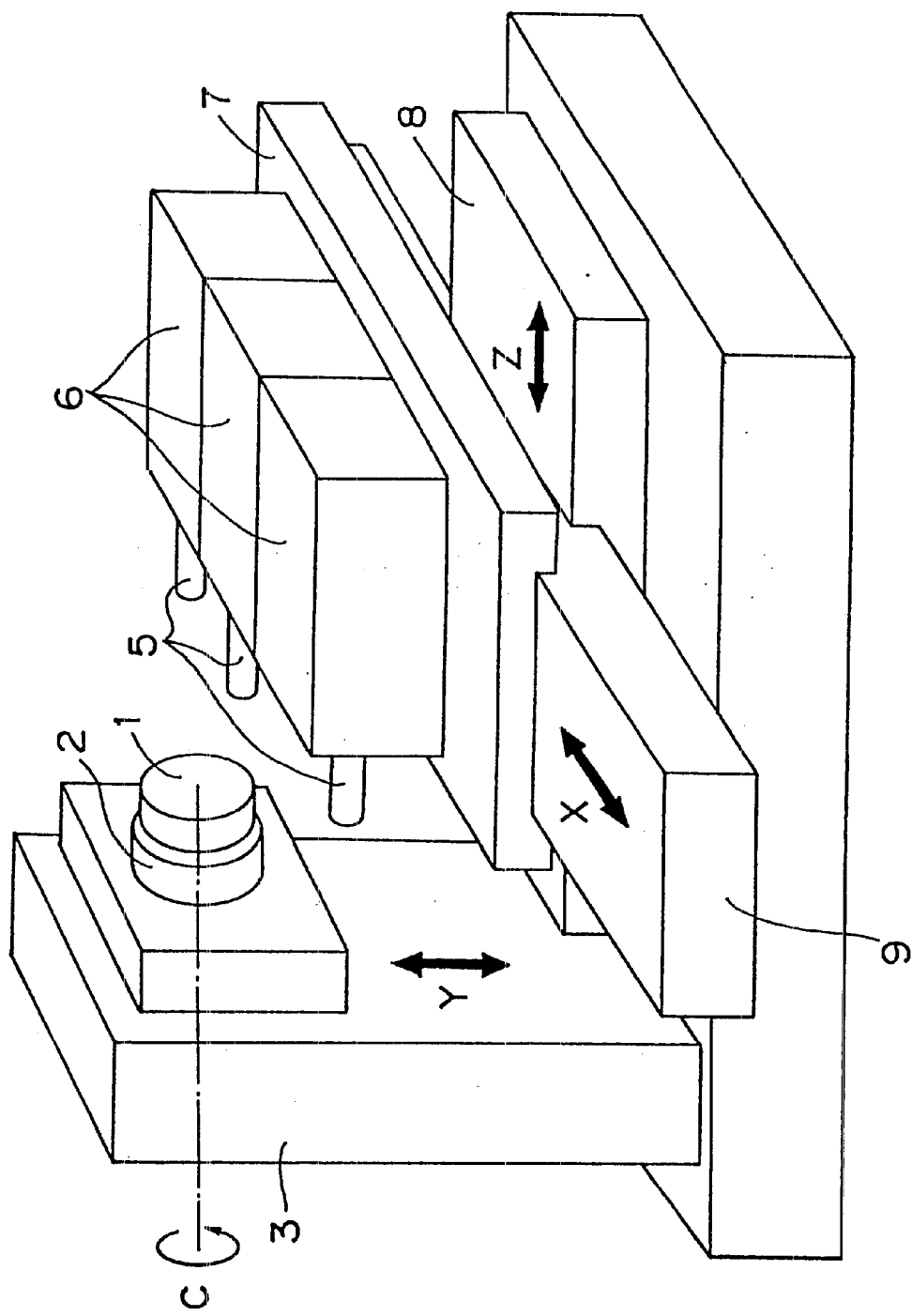
FIG. 1 is a perspective view of a conventional scroll machining system.

With reference to the drawings, a tri-axial scroll machining system and a scroll blade will be described briefly. FIG. 1 shows a typical scroll machining system for machining a scroll blade. A work-piece 1 is held by a work spindle 2 such that the work-piece 1 can rotate about a C-axis. The work spindle 2 is attached to a work spindle base 3 so that it can move in a Y-axis direction across a reference cyclotomic field of a scroll or involute configuration.

Tools 5 are positioned to face the work-piece 1. Spindle primary-axis portion 6 each holding the tools 5 are fixed to a slide table 7. The slide table 7 is mounted on Z-axis table 8 and X-axis table 9. The Z-axis table 8, which fixed to a base structure, allows the slide table 7 to move in a direction of the depth of a scroll groove, i.e., the Z-axis direction. The X-axis table 9, which is mounted on the Z-axis table 8, allows the slide table 7 to move in the X-axis direction. Therefore, the work-piece 1 and the tool 5 can move relative to each other in the X-axis direction, the Y-axis direction and the Z-axis direction which are perpendicular to each other, in combination with the movement of the work spindle 2 in the Y-axis direction. At machining, the tools 5 supported by the spindle primary-axis portion 6 rotate and then move forward in the Z-axis direction up to the bottom of the scroll groove, so that with an aid of the movement of the spindle 2 in synchronism with the rotation thereof about the C-axis a surface of the scroll blade, extending in the Z-direction, is machined.

Figure 2:
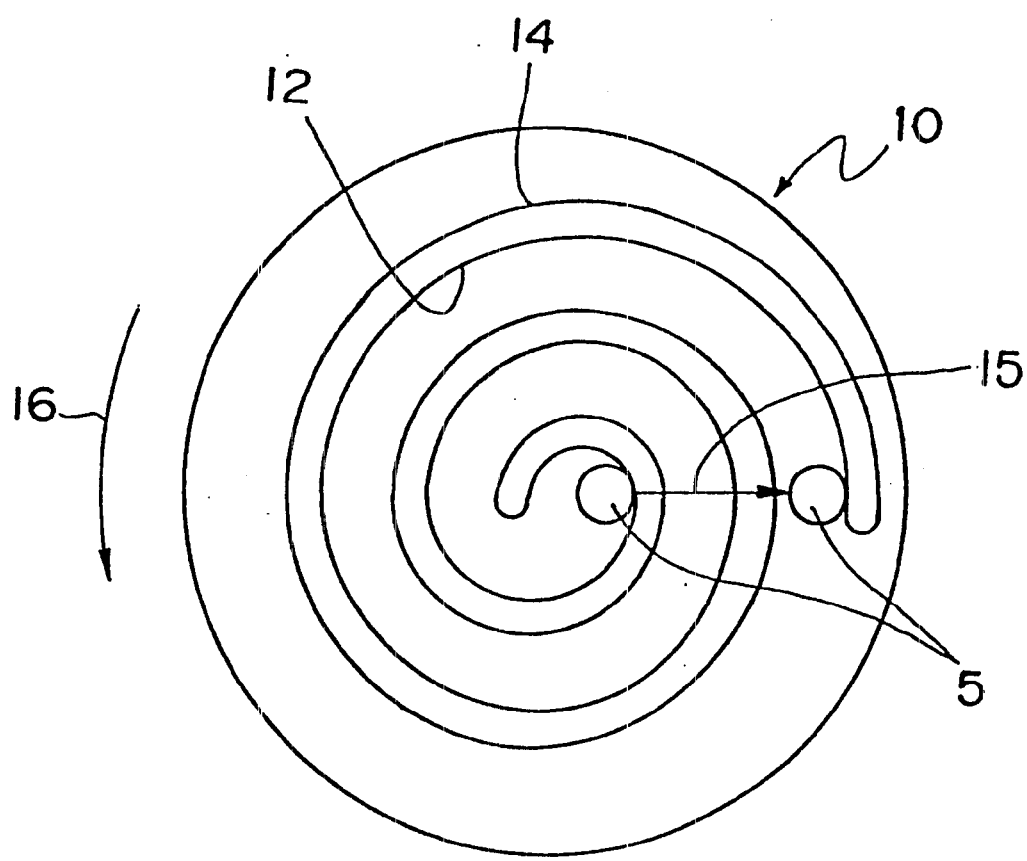
FIG. 2 is a front view generally showing a scroll blade.

FIG. 2 shows the scroll blade 10. The scroll blade 10, which is generally in the form of involute, has an inward surface 12 and an outward surface 14. The involute configuration is formed by the tools 5. In this formation, the tools 5 cut or grind as they move in the direction indicated by arrow 5 and on tangential lines of the reference circles for the involute configuration. At this moment, the work-piece 10 rotates in the direction indicated by arrow 16 in synchronism with the linear movement of the tools.

Figure 3:
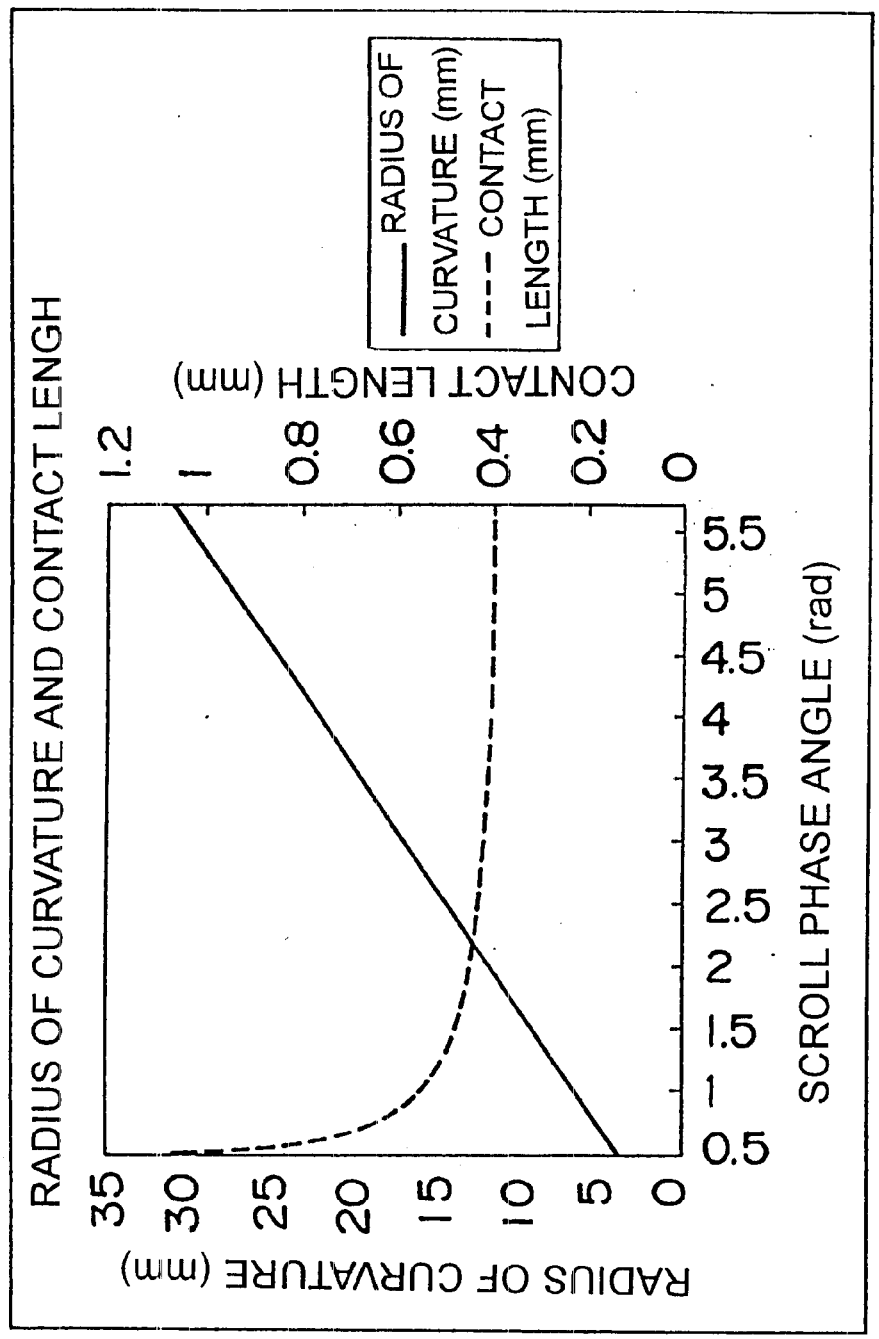
FIG. 3 is a graph showing a relationship between a position in a scroll configuration, a radius of curvature, and a contact length.

As can be seen from the scroll configuration shown in FIG. 2, according to the movement of the tools 5 radially outwardly in synchronism with the rotation of the work 10, a radius of curvature at each point gradually increases, which is graphed in FIG. 3 in which a relationship between a scroll phase-angle and the radius of curvature is indicated at the solid line. In this graph, indicated at the dotted line is the contact length between the work-piece 10 and the tool 5. As can be seen from the graph, the machining at locations closer to the central portion of the scroll and with less radius of curvatures provides increased contact length and machining resistance. As described above, for the machining device shown in FIG. 1 in which the tool is supported at one end thereof in a cantilever fashion, the machining precision depends upon the variation of the machining resistance.

Figure 4:
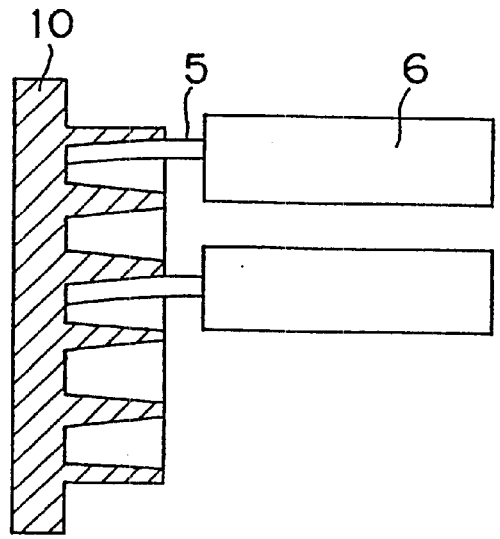
FIG. 4 is an explanatory diagram comparing machining according to the conventional technique and machining according to the present invention.
Figure 4:
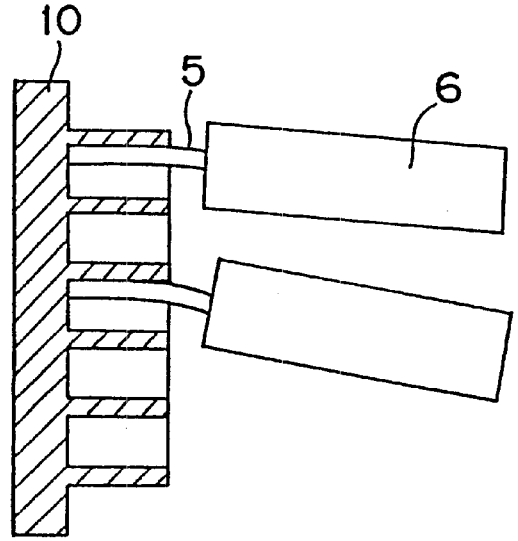

This is schematically illustrated in FIGS. 4A and 4B showing the work-piece 10, the spindle primary-axis portion 6 and the tool 5, viewed from the Y-axis direction. FIG. 4A represents a conventional machining where the spindle 6 extends parallel to the rotation axis C of the work-piece 10 and the tool 5 is deflected due to the machining resistance. The deflection is larger at the central portion of the work-piece (the lower side in FIG. 4A) that provides less radius of curvature in the scroll. As a result, the inward and outward surfaces are no longer parallel to each other nor liner, which varies a thickness of the wall of the scroll blade. In contrast, according to the present invention, as shown in FIG. 4B, a relative angle between the spindle primary-axis portion 6 and the work-piece 10 is controlled in accordance with a variation in machining load and thereby the amount of deflection of the tool is corrected, whereby the opposing surfaces of the scroll blade are maintained parallel to the Z-axis and a desired involute configuration is obtained.

Figure 5:
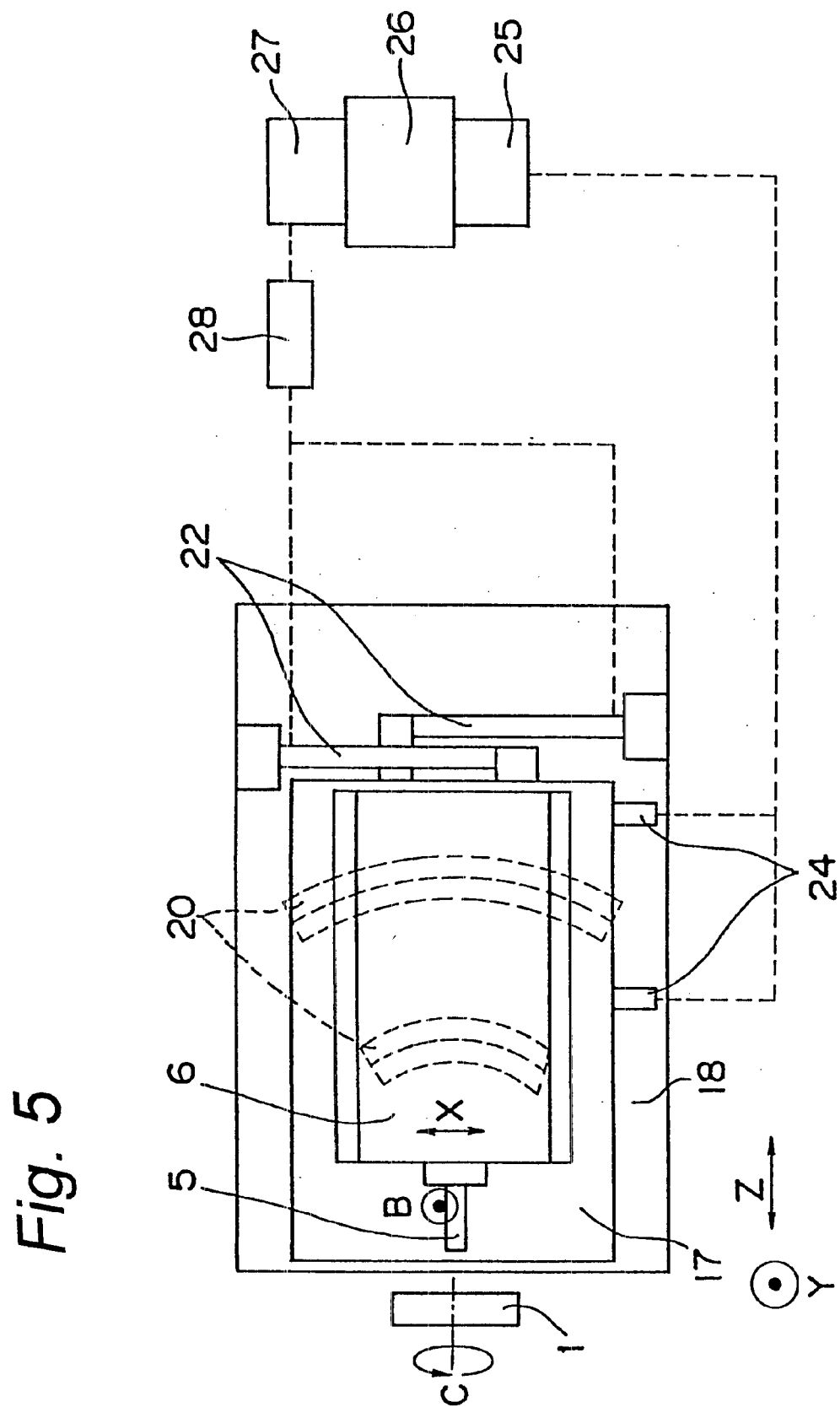
FIG. 5 is a plan view of a machining system according to a preferred embodiment of the present invention.
Figure 6:
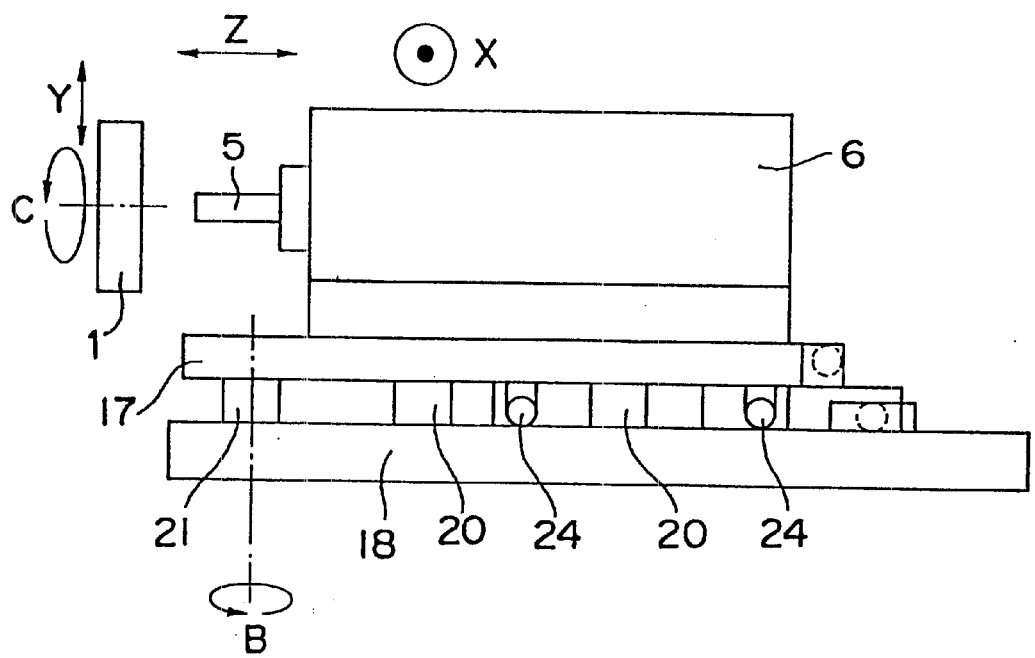
FIG. 6 is a side view of the machining system of FIG. 5.
Figure 7:
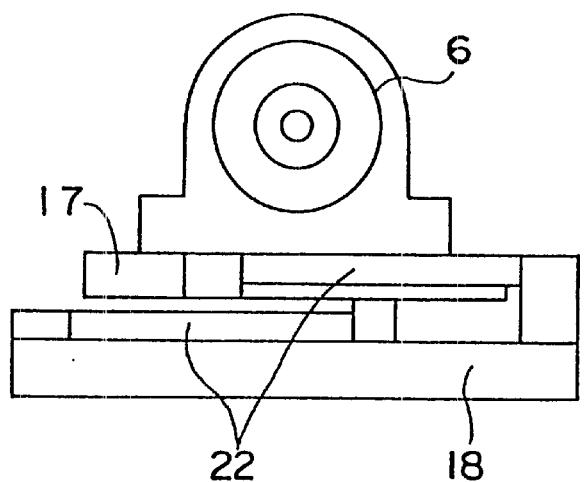
FIG. 7 is a back view of the machining system of FIG. 5.

Embodiments of the machining system according to the present invention will be described with reference to the drawings hereinafter. FIGS. 5 through 7 show a first embodiment of the machining system according to the present invention, suitably available to a scroll machining system. In FIG. 5, a work-piece 1 is fixed to a work spindle not shown such that the work-piece 1 can rotate about the axis C. The tool 5 is supported by the spindle primary-axis portion 6. The spindle primary-axis portion 6 is attached to a spindle primary-axis base 17. At machining, the tool 5 rotates by the driving of the spindle primary-axis portion 6 and travels forward in the Z-axis direction to bring into contact with the work-piece 1. After reaching a bottom portion of the scroll groove, the tool 5 machines a curved peripheral surfaces of a scroll blade by the relative movement between the work-piece 1 and the tool 5 in the X-axis direction, in synchronism with the rotation about the C-axis.

In order to prevent an actual machining position from deviating from a target machining position due to a machining resistance of the tool 5, the machining system is designed such that the spindle primary-axis base 17 supporting the spindle primary-axis portion 6 is rotated a predetermined angle about a B-axis with respect to a base plate 18 supporting the primary-axis base 17, and the tool 5 is fed into the work-piece 1 so as to correct the deflection of the tool 5 caused by the machining resistance. For this purpose, the primary-axis base 17 is driven to rotate along a rotation guide 20 of a rail-like configuration defined on a circle with a central B-axis by piezoelectric or magnetically deformable elements 22 attached to the spindle primary-axis base 17. A revolutional movement of the primary-axis base 17 about the B-axis is detected by a displacement sensor 24 and then transmitted through an A/D converter 25 to a personal computer 26. The personal computer 26 calculates a difference between the detected revolution and a target position stored in the personal computer 26 in advance, and then outputs a signal indicative of the difference. An amplifier 28 amplifies the signal outputted through a D/A converter 27 from the personal computer 26. A voltage corresponding to the amplified signal is thereafter applied to the piezoelectric or magnetically deformable elements 22.

The displacement sensor 24 and the piezoelectric or magnetically deformable elements 22 are connected in a closed loop circuit, which allows to control the rotation accuracy of the B-axis at the resolution of the displacement sensor 24. Further, since the primary-axis base 17 is driven using the piezoelectric or magnetically deformable elements 22, it is possible to ensure a high-speed response and a high-rigidity of this drive mechanism. This mechanism realizes an angular compensation at a resolution even as fine as in seconds. Although the work-piece 1 and the tool 5 move relative to each other during machining, the structure ensures that a machining point and the center of the rotation about the B-axis do not move relative to each other during machining. To this end, in the structure according to the first embodiment, the B-axis as well moves in synchronism with the movement of the tool 5.

Specifically, the first embodiment includes two piezoelectric or magnetically deformable elements 22, thereby providing a higher responsibility irrespective of the drive direction. Although the pin 21 is positioned at the rotational center together with the rotational guide 20 for a mechanism used as a restriction in the rotational direction, it is not always necessary provided that the movement in the radius direction about the B-axis is restricted. On the other hand, if the pin 21 is provided, the rotation guide 20 restricting the movement in the radius direction is in turn unnecessary, and therefore, the spindle primary-axis portion 6 may be supported for rotation. In the specification, the rotation guide 20 may take any one of those variations. According to the embodiment, it is possible to obtain a machining system capable of machining precise configurations (e.g., right angle, straight line, circle, flat surface) by using the machining system shown in FIG. 1, for example, as a base machine and attaching the above-described mechanism permitting rotation about the B-axis to the slide table.

Second Embodiment

Figure 8:
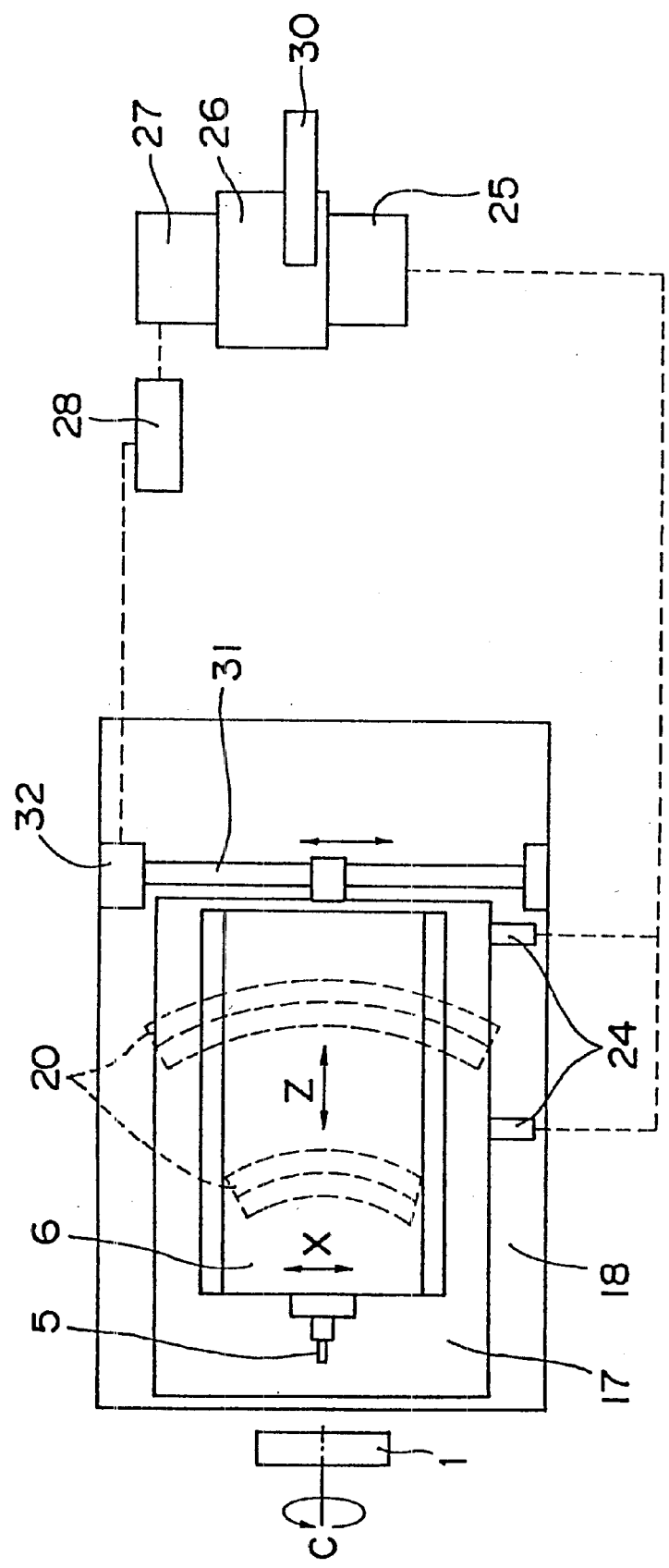
FIG. 8 is a plan view of a machining system according to other preferred embodiment of the present invention.
Figure 9:
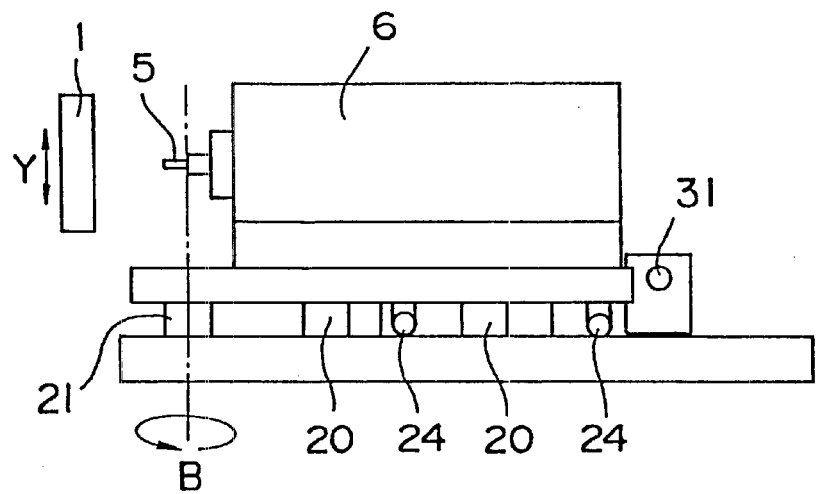
FIG. 9 is a side view of the machining system of FIG. 8.
Figure 10:
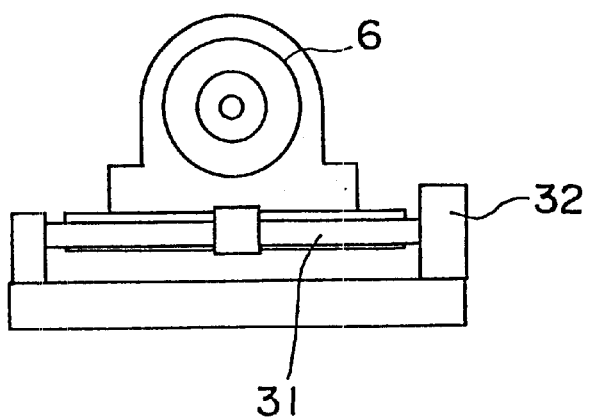
FIG. 10 is a rear view of the machining system of FIG. 8.

FIGS. 8 through 10 show a second preferred embodiment of the machining system according to the present invention. In FIG. 8, the spindle primary-axis portion 6 rotating the tool 5 for machining the work-piece 1 is attached to the spindle primary-axis base 17. In order to rotate the spindle primary-axis base 17 about the B-axis relative to the base plate 18, in a condition that movement of the primary-axis base 17 in the radius direction being restricted by the rotation guide 20, a feed screw 31 and a motor 32 provide a rotational force to the primary-axis base 17. Since the rotation movement is very small, the feed screw 31 linearly driving can be used. A revolution volume of the primary-axis base 17 about the B-axis is detected by the displacement sensor 24 and sent to a personal computer 26 via an A/D converter 25. The personal computer 26 calculates a difference between the detected revolution volume and a target displacement volume saved in the personal computer 26, and outputs a signal indicative of the difference. The amplifier 28 amplifies the signal outputted from the personal computer 26, through the D/A converter 27. The motor 32 thereafter rotates the feed screw 31 in accordance with the amplified signal.

Since the output from the displacement sensor 24 and a revolution volume of the motor 32 are in a closed loop circuit, it is possible to control the rotation accuracy of the rotation about the B-axis at the resolution of the displacement sensor 24. Further, with a revolution volume of the feed screw 31 controlled using a DC servomotor 32, it is possible to ensure a high-speed response and a high rigidity of this drive mechanism. This mechanism realizes angular compensation at a resolution even as fine as in seconds. Although the work-piece 1 and the tool 5 move relative to each other during the machining, the structure ensures that a machining point and the center of the B-axis rotation do not move relative to each other during this.

In this manner, as a position of the rotation of the spindle primary-axis portion 6 is controlled in accordance with a variation in machining load, the amount of distortion of the tool is corrected. This makes it possible to process at a high accuracy even a complex configuration, such as that of a scroll blade where the machining resistance could change depending on a machining point. As described above, according to the second preferred embodiment, using a machining system shown in FIG. 1, for example, as a base machine and attaching the mechanism where the spindle primary-axis base 17 rotates about the B-axis, a machining system is realized to configuration highly precise configurations (right angle, straight line, circle, flat surface, etc.). In addition, comparing the second preferred embodiment with the first preferred embodiment, the rotation angle is corrected and controlled in a larger range although the driven control speed is slower in the second preferred embodiment.

Third Embodiment

Figure 11:
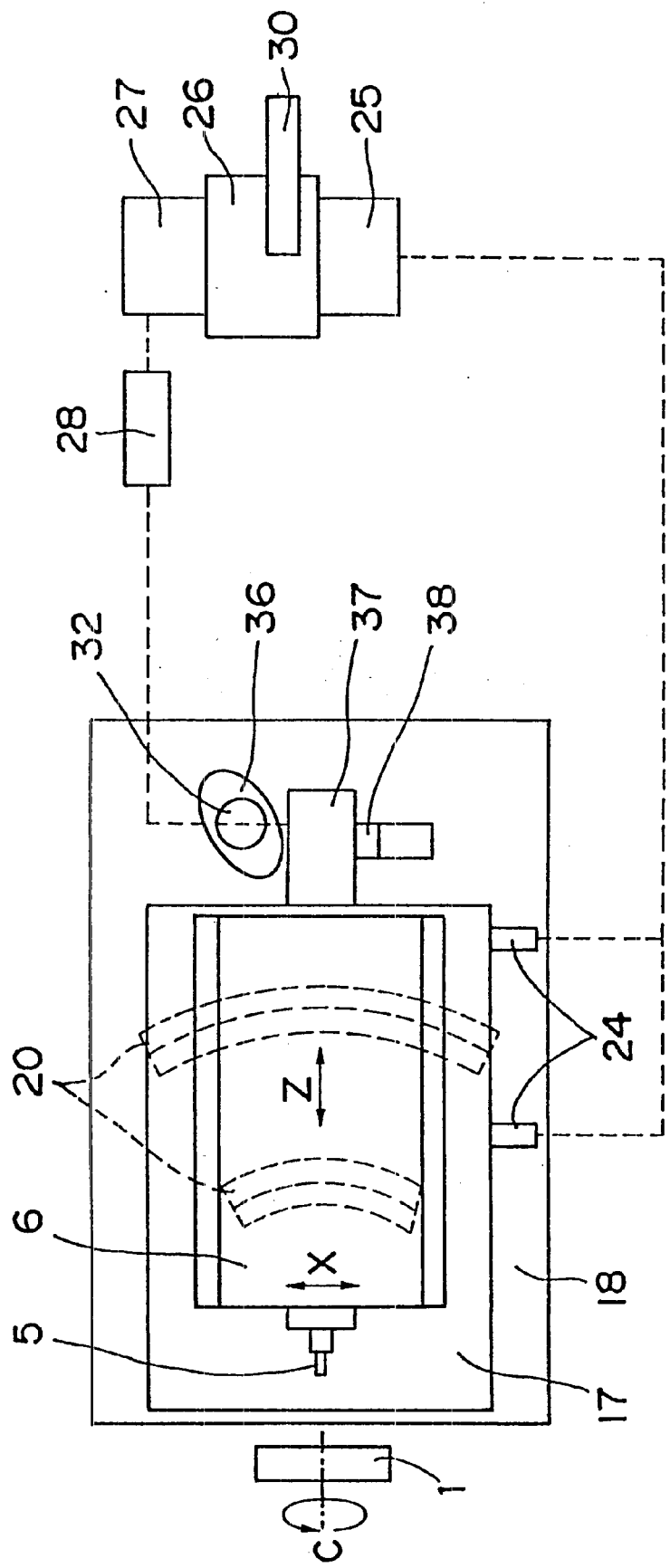
FIG. 11 is a plan view of a machining system according to still other preferred embodiment of the present invention.
Figure 12:
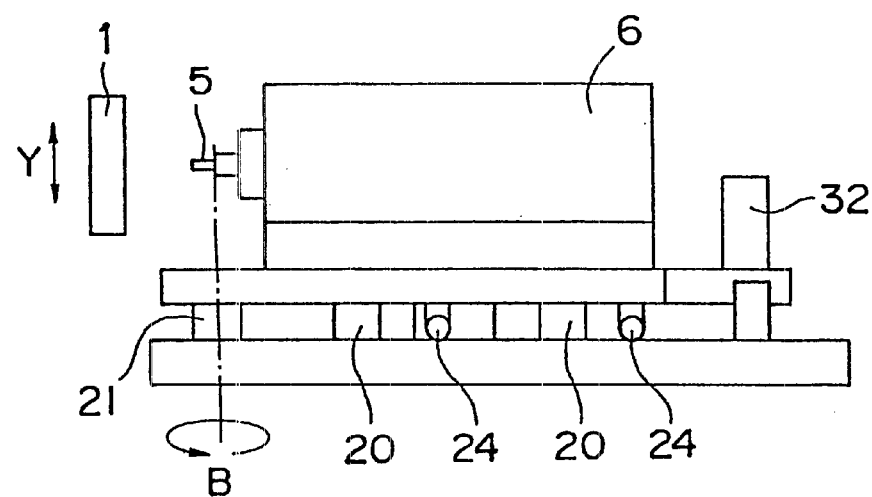
FIG. 12 is a side view of the machining system of FIG. 11.
Figure 13:
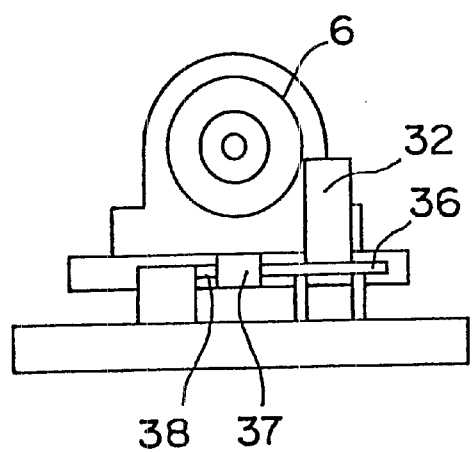
FIG. 13 is a back view of the machining system of FIG. 11.

FIGS. 11 through 13 show a third preferred embodiment of the machining system according to the present invention. The same portions as those described in relation to the preferred embodiments above are denoted at the same reference symbols, and not described repeatedly. According to the third preferred embodiment, as shown in FIG. 11, in a condition that movement of the primary-axis base 17 in the radius direction restricted by the rotation guide 20, rotation of the motor 32 is transmitted to an element of action 37 through a cam 36, so that the primary-axis base 17 rotates about the B-axis. An element of reaction force 38, such as a spring, is disposed on the opposite side to the cam 36. Hence, with the element of reaction force 38 and the cam 36 appropriately adjusted, it is possible to apply a pre-load on the element of action 37, and therefore, to allow the spindle primary-axis base 17 to smoothly rotate about the B-axis.

As in the preferred embodiments described above, with the rotation position of the cam 36 controlled using a DC servomotor based on monitoring with a sensor and calculation with a personal computer, it is possible to ensure a high-speed response. In addition, using the element of reaction force 38, it is ensured that the drive mechanism has a high rigidity. Compensation using the mechanism according to the third preferred embodiment, too, as the preferred embodiments described above, has an angular resolution even as fine as in seconds. Further, although the work-piece 1 and the tool 5 move relative to each other during machining, the structure ensures that a machining point and the center of the B-axis rotation do not move relative to each other during this. Still further, attaching the mechanism above to the scroll machining system, it is possible to configuration highly precise configurations (right angle, straight line, circle, flat surface, etc.). Comparing the third preferred embodiment with the first preferred embodiment, although the control speed is slow, the mechanism for control of compensation is smaller and less expensive in the third preferred embodiment.

Fourth Embodiment

Figure 14:
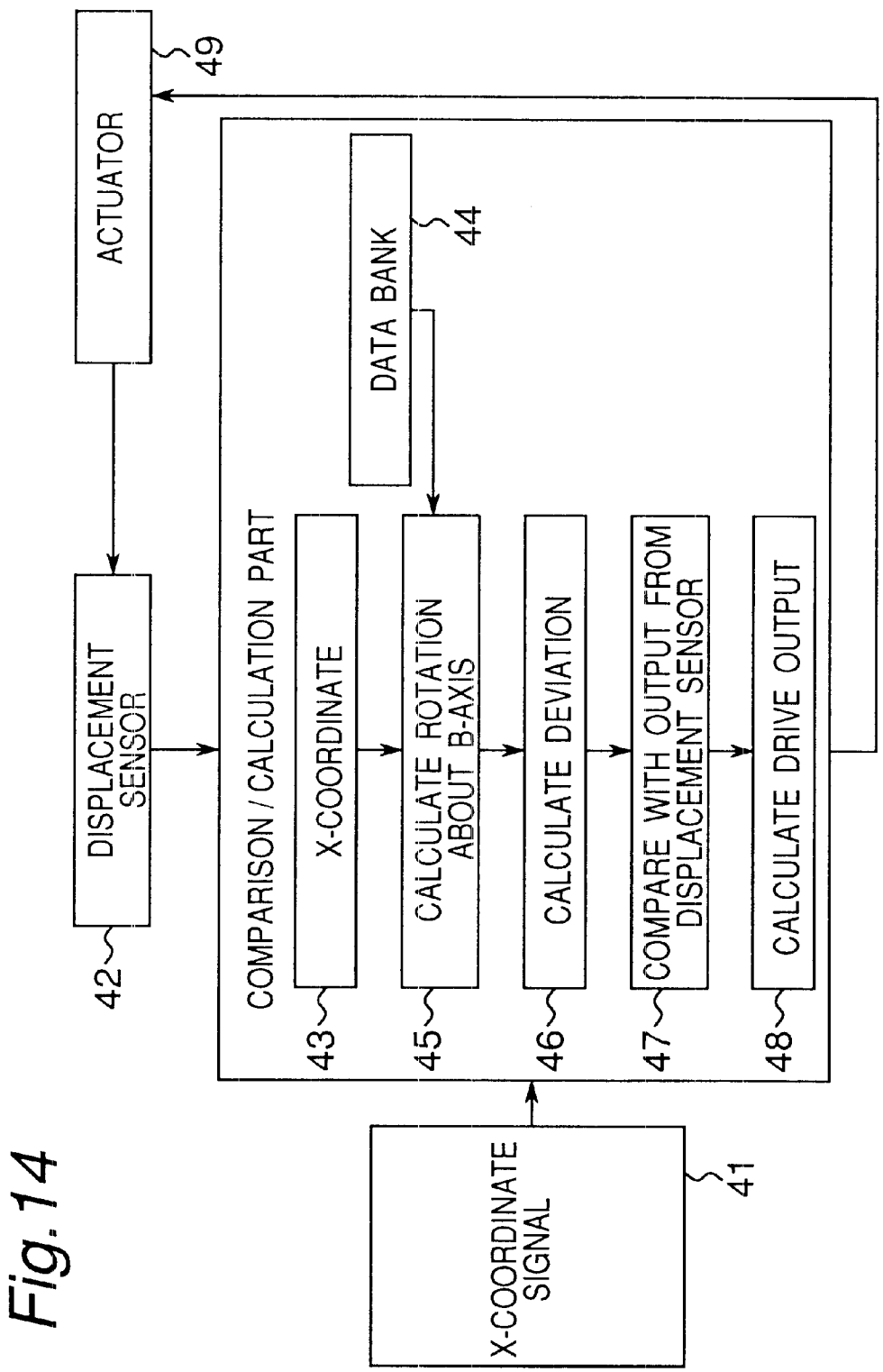
FIG. 14 is a block diagram showing a method for calculating a B-axis revolution volume, using an X-coordinate value signal as the reference.

A fourth preferred embodiment of the present invention is described with reference to FIG. 14. According to the fourth preferred embodiment, in a machining system comprising such a mechanism as those described in relation to the first through the third preferred embodiments in which the spindle primary-axis portion rotates about the B-axis, a revolution volume about the B-axis is calculated and controlled based on an X-coordinate value signal from a processor main unit.

In this machining system, a comparison/calculation part inside a personal computer receives an X-coordinate value signal from a machine main unit (block 41) and a signal from the displacement sensor 24 (block 42). As herein referred to, the X-coordinate value signal is a signal representing the amount of movement of the spindle primary-axis portion in the X-axis direction with assuming the C-axis, the center of rotation of the work-piece 1, as the origin, and the X-coordinate value signal is detected by a sensor or the like disposed to the machine main unit. Meanwhile, the signal from the displacement sensor 24 is a signal representing a distance between the spindle primary-axis base 17 and the displacement sensor 24. A data storage part (block 44) saves in advance a predetermined revolution volume of the spindle primary-axis base 17 about the B-axis in accordance with each X-coordinate. First, the comparison/calculation part calculates, at a block 45, a revolution volume about the B-axis of the involute curve line of the scroll blade at the current machining position, from the data above saved in the data storage part in advance and the entered X-coordinate signal (block 43). Next, at a block 46, based on the signal from the displacement sensor 24, using a conversion coefficient determined by the B-axis and the location of the displacement sensor as well, the amount of current displacement of the spindle primary-axis base 17 is calculated.

Following this, at a block 47, a difference between the calculated revolution volume about the B-axis and the amount of displacement of the spindle primary-axis base on the basis of the signal from the displacement sensor 24 is calculated. At a block 48, a drive output (drive volume) corresponding to the difference is calculated, and a signal corresponding to the drive output is supplied at a block 49 to an actuator, such as a piezoelectric element, a magnetostrictive element, or a motor driving a feed screw or a cam. The actuator is driven in response to this input signal, whereby the spindle primary-axis portion rotates about the B-axis. Further, the output signal from the displacement sensor 24 is changed in accordance with the rotation of the spindle primary-axis portion. Using the changed output signal from the displacement sensor 24 (block 42) and the X-coordinate signal (block 43), the drive output is corrected (blocks 45 to 48). The procedure above is controlled in real time until the end of the machining.

Fifth Embodiment

Figure 15:
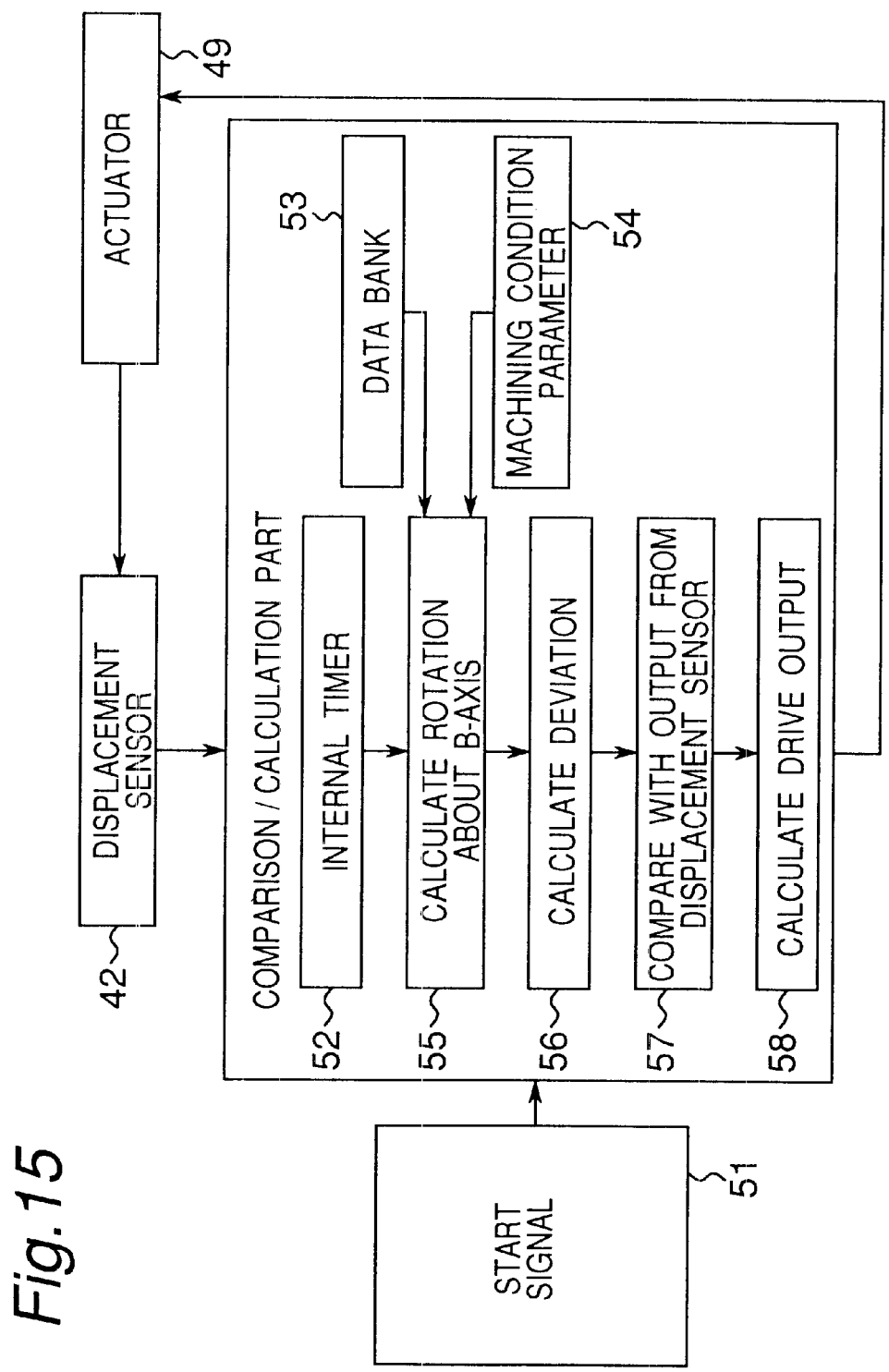
FIG. 15 is a block diagram showing a method for calculating a B-axis revolution volume, using a start signal as a starting point.

A fifth preferred embodiment of the present invention is described with reference to FIG. 15. According to the fifth preferred embodiment, in a scroll machining system comprising such a mechanism as those described in relation to the first through the third preferred embodiments where the spindle primary-axis portion rotates about the B-axis, a revolution volume about the B-axis is calculated and controlled using a start signal from a machining system main unit as a starting point.

In this machining system, a comparison/calculation part inside a personal computer receives a start signal from a machine main unit (block 51) and a signal from the displacement sensor 24 (block 42). As herein referred to, the start signal is a signal representing a time at starting the machining of the scroll blade, and an internal timer starts measuring time based on this signal. A data storage part (block 53) saves in advance a predetermined revolution volume of the spindle primary-axis base 17 about the B-axis calculated using time as a variable. First, the comparison/calculation part calculates, at a block 55, a revolution volume about the B-axis at the current machining position, from the data above saved in the data storage part in advance, a timer value of the internal timer (block 52) and a machining condition parameter (block 54). Next, at a block 56, based on the signal from the displacement sensor 24, using a conversion coefficient determined by the B-axis and the location of the displacement sensor, the amount of current displacement of the spindle primary-axis base 17 is calculated.

Following this, at a block 57, a difference between the calculated revolution volume about the B-axis and the amount of displacement of the spindle primary-axis base on the basis of the signal from the displacement sensor 24 is calculated. At a block 58, a drive output (drive volume) corresponding to the difference is calculated, and a signal corresponding to the drive output is supplied at the block 49 to an actuator such as a piezoelectric element. The actuator is driven in response to this input signal, whereby the spindle primary-axis portion rotates about the B-axis. Further, the output signal from the displacement sensor 24 is changed in accordance with the rotation of the spindle primary-axis portion. Using the changed output signal from the displacement sensor 24 (block 42) and the internal timer value (block 52), the drive output is corrected (blocks 55 to 58). The procedure above is controlled in real time until the end of the machining.

Sixth Embodiment

Figure 16:
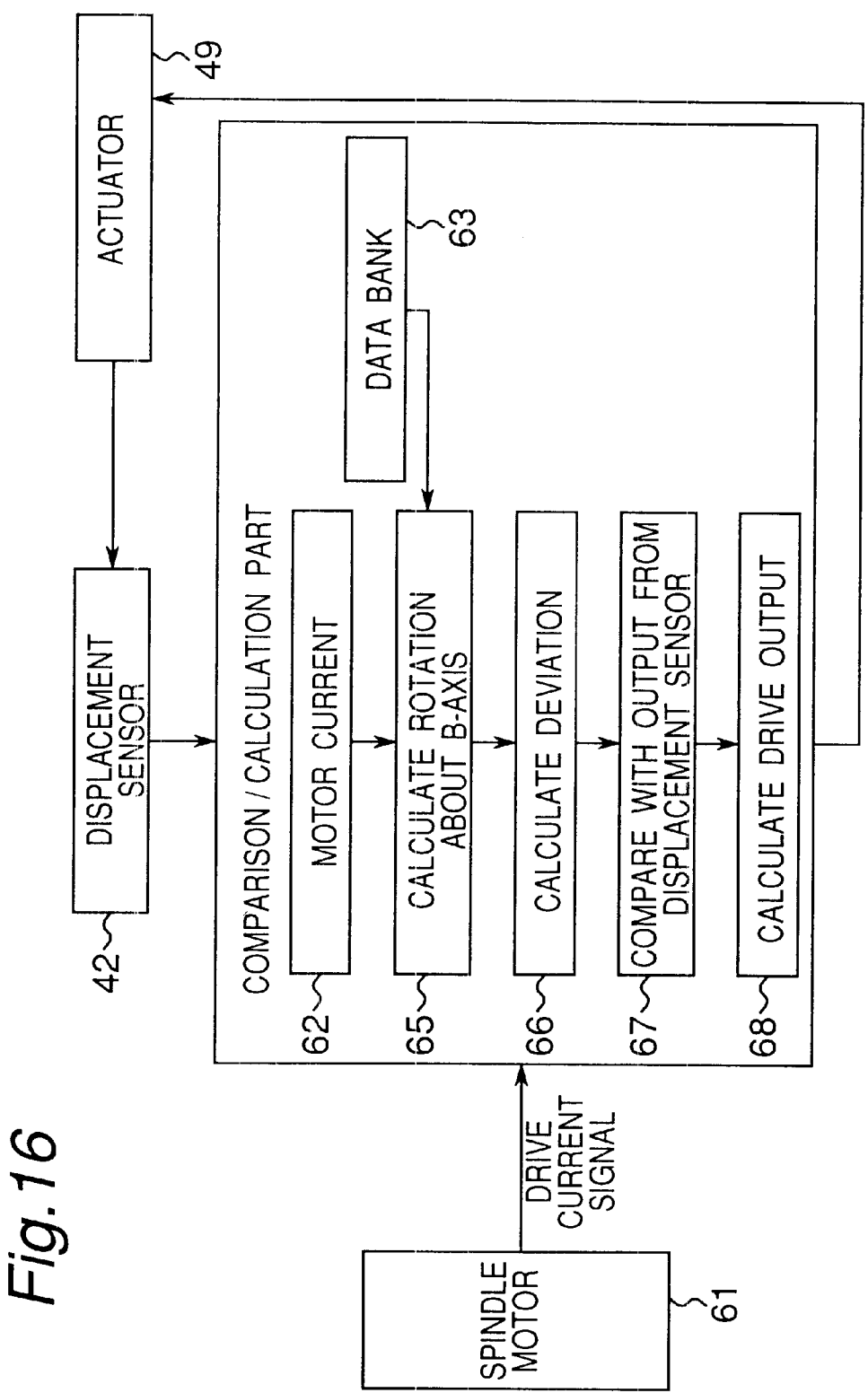
FIG. 16 is a block diagram showing a method for calculating a B-axis revolution volume in accordance with a motor current.

A sixth preferred embodiment of the present invention is described with reference to FIG. 16. According to the sixth preferred embodiment, in a scroll machining system comprising such a mechanism as those described in relation to the first through the third preferred embodiments where the spindle primary-axis portion rotates about the B-axis, a revolution volume of the spindle primary-axis portion about the B-axis is calculated and controlled based on a motor current of the spindle primary-axis portion 6.

In this machining system, a comparison/calculation part inside a personal computer receives a drive current signal from a machine main unit (block 61) and a signal from the displacement sensor 24 (block 42). As herein referred to, the drive current signal is a signal representing the size of a current flowing in a motor which drives the spindle primary-axis portion machining the scroll blade, and the drive current signal is detected by an ammeter attached to the machine main unit. A data storage part (block 63) saves in advance a machining load corresponding to the motor current value, as well as data regarding a revolution volume of the spindle primary-axis base 17 about the B-axis based on the amount of distortion of the tool calculated from the machining load. First, the comparison/calculation part calculates, at a block 65, a revolution volume about the B-axis at the current machining position, from the data above saved in the data storage part in advance and a motor current (block 62). Next, at a block 66, based on the signal from the displacement sensor 24, using a conversion coefficient determined by the B-axis and the location of the displacement sensor, the amount of current displacement of the spindle primary-axis base 17 is calculated.

Following this, at a block 67, a difference between the calculated revolution volume about the B-axis and the amount of displacement of the spindle primary-axis base on the basis of the signal from the displacement sensor 24 is calculated. At a block 68, a drive output (drive volume) corresponding to the difference is calculated, and a signal corresponding to the drive output is supplied at the block 49 to an actuator such as a piezoelectric element. The actuator is driven in response to this input signal, whereby the spindle primary-axis portion rotates about the B-axis. Further, the output signal from the displacement sensor 24 is changed in accordance with the rotation of the spindle primary-axis portion. Using the changed output signal from the displacement sensor 24 (block 42) and the motor current (block 62), the drive output is corrected (blocks 65 to 68). The procedure above is controlled in real time until the end of the machining.

Seventh Embodiment

Figure 17:
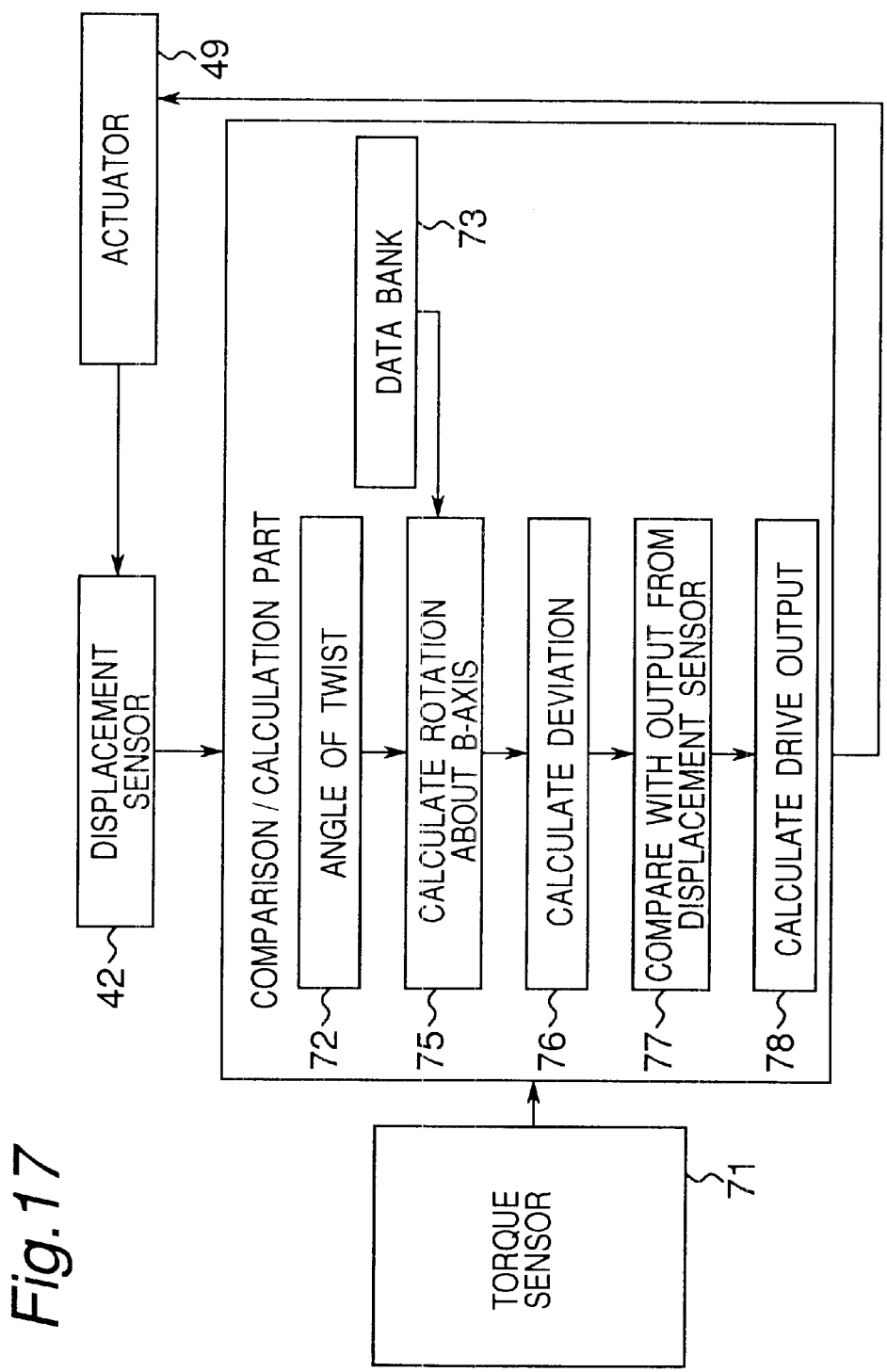
FIG. 17 is a block diagram showing a method for calculating a B-axis revolution volume in accordance with an angle of twist.

A seventh preferred embodiment of the present invention is described with reference to FIG. 17. According to the seventh preferred embodiment, in a scroll machining system comprising such a mechanism as those described in relation to the first to the third preferred embodiments where the spindle primary-axis portion rotates about the B-axis, a revolution volume about the B-axis is calculated and controlled from an angle of twist of the tool 5 or the rotation axis of the spindle primary-axis portion 6.

In this machining system, a comparison/calculation part inside a personal computer receives a signal from a torque sensor of a machine main unit (block 71) and a signal from the displacement sensor 24 (block 42). As herein referred to, the signal from the torque sensor is a signal for calculating an angle of twist of the tool or the rotation axis of the spindle primary-axis portion, and detected by the torque sensor utilizing such a method as a photoelastic measurement method using laser light. A data storage part (block 73) saves in advance a machining load corresponding to the angle of twist as well as data regarding a revolution volume of the spindle primary-axis base 17 about the B-axis based on the amount of distortion of the tool calculated from the machining load. First, the comparison/calculation part calculates, at a block 75, a revolution volume about the B-axis at the current machining position, from the data above saved in the data storage part in advance and the angle of twist (block 72). Next, at a block 76, based on the signal from the displacement sensor 24, using a conversion coefficient determined by the B-axis and the location of the displacement sensor, the amount of current displacement of the spindle primary-axis base 17 is calculated.

Following this, at a block 77, a difference between the calculated revolution volume about the B-axis and the amount of displacement of the spindle primary-axis base on the basis of the signal from the displacement sensor 24 is calculated. At a block 78, a drive output (drive volume) corresponding to the difference is calculated, and a signal corresponding to the drive output is supplied at the block 49 to an actuator such as a piezoelectric element. The actuator is driven in response to this input signal, whereby the spindle primary-axis portion rotates about the B-axis. Further, the output signal from the displacement sensor 24 is changed in accordance with the rotation of the spindle primary-axis portion. Using the changed output signal from the displacement sensor 24 (block 42) and the angle of twist (block 72), the drive output is corrected (blocks 75 to 78). The procedure above is controlled in real time until the end of the machining.

Eighth Embodiment

Figure 18:
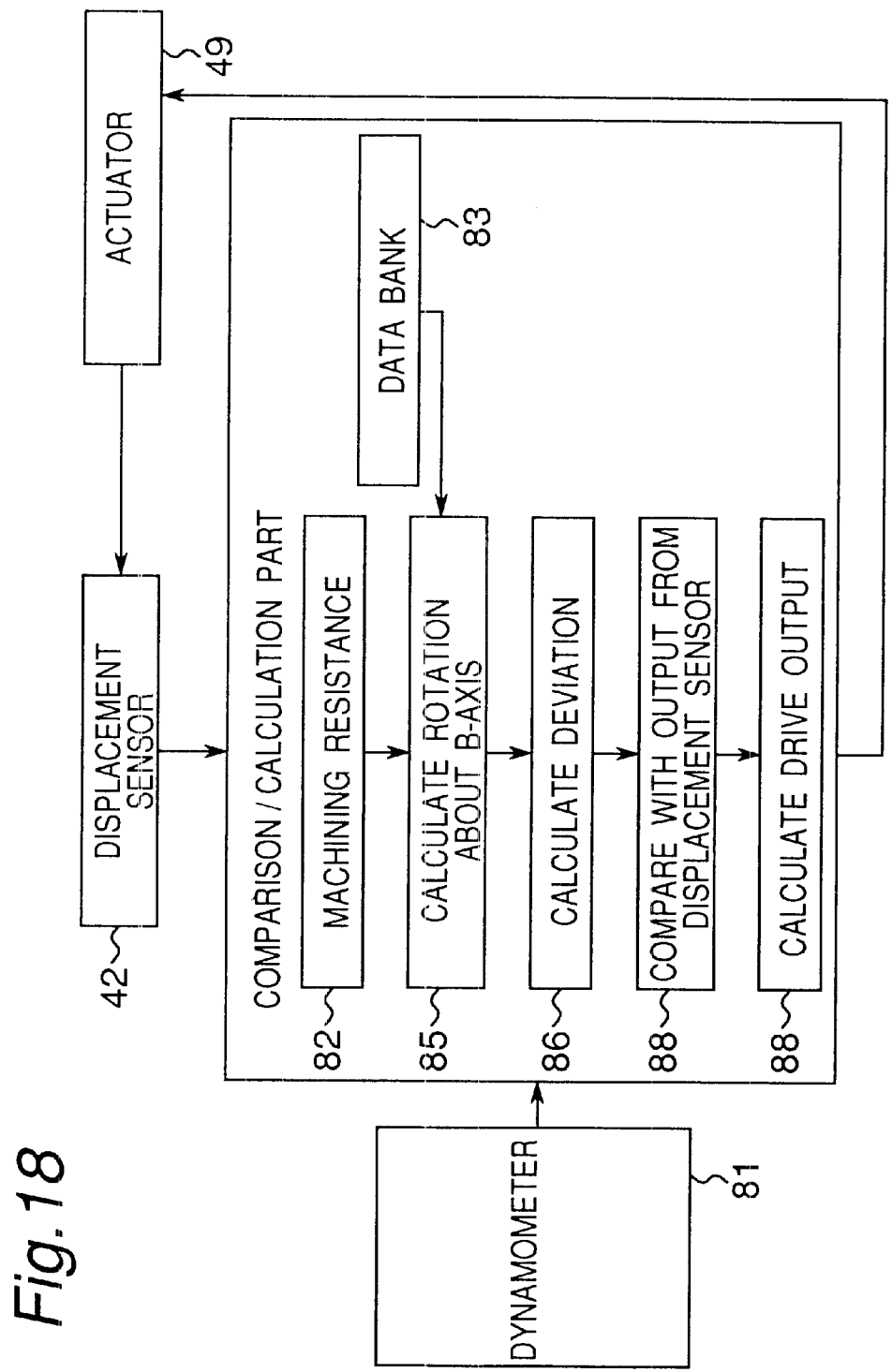
FIG. 18 is a block diagram showing a method for calculating a B-axis revolution volume in accordance with cutting/grinding power.

An eighth preferred embodiment of the present invention is described with reference to FIG. 18. According to the eighth preferred embodiment, in a scroll machining system comprising such a mechanism as those described in relation to the first through the third preferred embodiments where the spindle primary-axis portion rotates about the B-axis, a revolution volume about the B-axis is calculated and controlled from cutting/grinding power during machining.

In this machining system, a comparison/calculation part inside a personal computer receives a signal from a dynamometer of a machine main unit (block 81) and a signal from the displacement sensor 24 (block 42). As herein referred to, the signal from the dynamometer is a signal indicative of the size of cutting/grinding power during machining of a scroll blade, the size of machining resistance, and the signal is detected by a dynamometer disposed to a lower portion of the spindle primary-axis base and having a built-in piezoelectric element. A data storage part (block 83) saves in advance data regarding a revolution volume of the spindle primary-axis base 17 about the B-axis based on the amount of distortion of the tool calculated from the machining resistance. First, the comparison/calculation part calculates, at a block 85, a revolution volume about the B-axis of the involute curve line of the scroll blade at the current machining position, from the data above saved in the data storage part in advance and the machining resistance (block 82). Next, at a block 86, based on the signal from the displacement sensor 24, using a conversion coefficient determined by the B-axis and the location of the displacement sensor, the amount of current displacement of the spindle primary-axis base 17 is calculated.

Following this, at a block 87, a difference between the calculated revolution volume about the B-axis and the amount of displacement of the spindle primary-axis base on the basis of the signal from the displacement sensor 24 is calculated. At a block 88, a drive output (drive volume) corresponding to the difference is calculated, and a signal corresponding to the drive output is supplied at the block 49 to an actuator such as a piezoelectric element. The actuator is driven in response to this input signal, whereby the spindle primary-axis portion rotates about the B-axis. Further, the output signal from the displacement sensor 24 is changed in accordance with the rotation of the spindle primary-axis portion. Using the changed output signal from the displacement sensor 24 (block 42) and the machining resistance (block 82), the drive output is corrected (blocks 85 to 88). The procedure above is controlled in real time until the end of the machining.

Ninth Embodiment

A ninth preferred embodiment of the present invention is described with reference to FIG. 19. According to the ninth preferred embodiment, in the methods shown in FIGS. 14 through 18 (the fifth preferred embodiment through the eighth preferred embodiment) requiring to calculate a revolution volume of the spindle primary-axis portion about the B-axis, in order to reduce an influence of unstable factors over the machining accuracy due to abrasion of the tool, variations in machining capability of tool, etc., the data storage part is updated in an order shown in FIG. 19.

Figure 19:
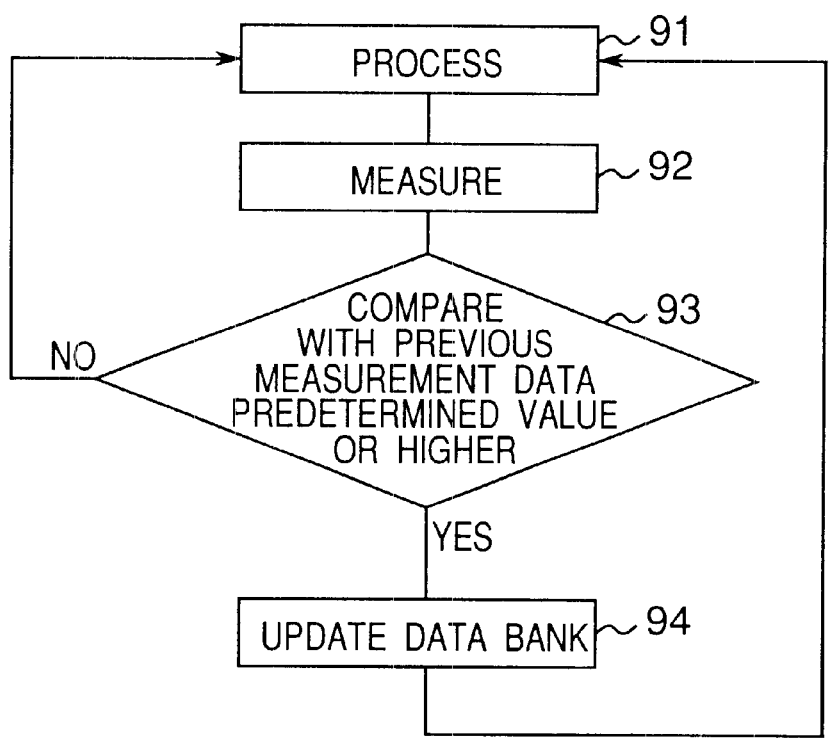
FIG. 19 is a flow chart of a method of updating a data storage portion.

In FIG. 19, at a block 91, scroll machining is performed with a revolution volume of the spindle primary-axis base about the B-axis controlled. Following this, at a block 92, the linearity at a predetermined position in a scroll surface is measured. At a block 93, the measurement result is compared with a previous measurement result, and when there is a change of a predetermined value or more between the two results, the data registered in the comparison/calculation part are updated at a block 94. When the change is equal to the predetermined value or smaller, the machining based on the data storage part at the block 91 is continued.

For example, when there is a change of the predetermined value or more between the measurement result immediately after the machining and the previous measurement result, it means that a revolution volume about the B-axis corresponding to each one of the reference values (an X-coordinate value, a timer value, a motor current, an angle of twist, a machining resistance, etc.) described in relation to the fifth through the eighth preferred embodiments is not appropriate. Hence, when there is a change of the predetermined value or more, the revolution volume about the B-axis is multiplied by a predetermined correction coefficient in accordance with the change, to thereby update the data stored in the data storage part. After the updating, using the updated data, re-machining is instructed at the block 91 and a result of the machining is measured at the block 92. Updating of data using this feedback need be executed successively when the machining lacks stability, but may be executed intermittently when the stability of the machining is excellent.

The relative rotation about the B-axis between the rotation axis of the work spindle and the rotation axis of the spindle primary-axis portion of the tool described in relation to the fourth through the ninth preferred embodiments above can be controlled in process, and post-process control is also similarly possible.

Tenth Embodiment

A tenth preferred embodiment of the present invention is described with reference to FIG. 20. In the scroll machining system according to the first through the ninth preferred embodiments comprising a mechanism where the spindle primary-axis portion rotates about the B-axis, the accuracy of the configuration of the involute deteriorates owing to displacement of the B-axis. It is necessary to appropriately arrange the B-axis to prevent this.

Figure 20:
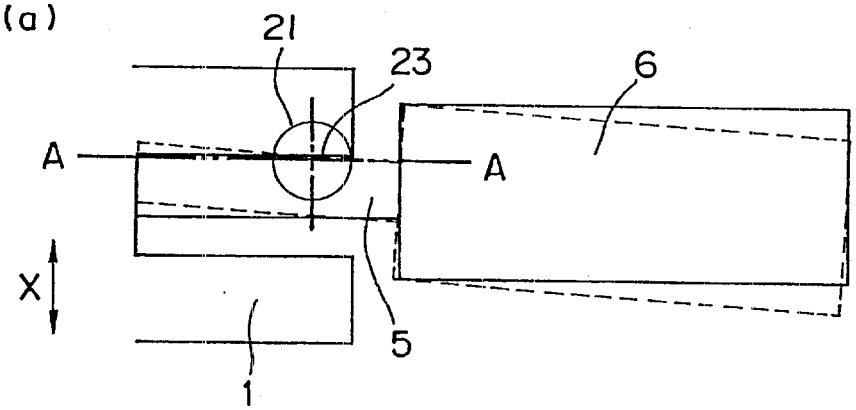
FIG. 20 is a plan view showing a difference in location of the center of rotation about a B-axis.
Figure 20:
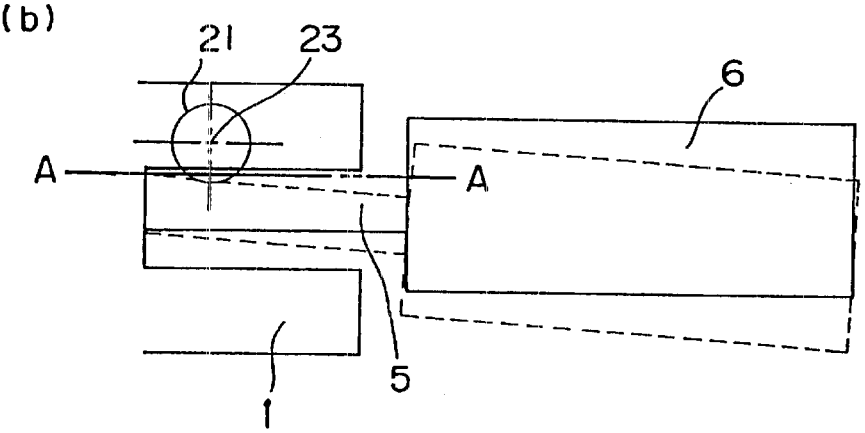
Figure 20:
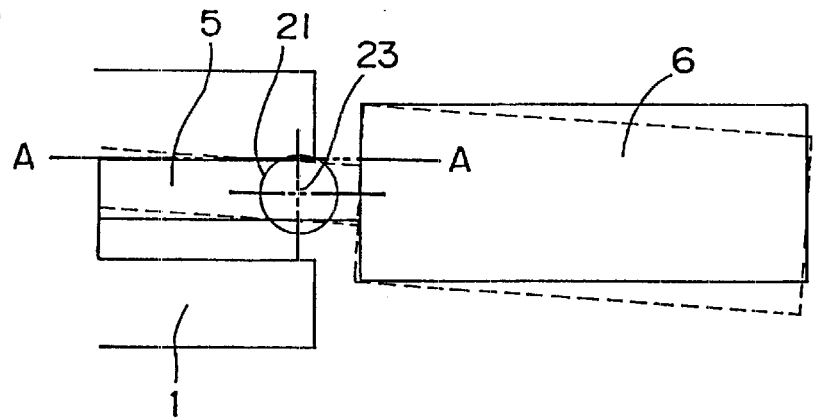

FIG. 20 shows, from the Y-axis direction, the tool 5, which is driven by the spindle primary-axis portion 6, as it processes the work-piece 1 while feeding the work-piece 1 on the machining point group A—A line in the X-axis direction. In FIG. 20, as a situation that the pin 21 is located at the center of rotation 23, there are three types of situations, (a) the center of rotation 23 is on a machining point group (on the A—A line in FIG. 20), (b) the center of rotation 23 is outside the tool, and (c) the center of rotation 23 is inside the tool. When warpage due to a machining resistance decreasing an angular accuracy exists only in the tool 5, that is, when other rigidities are sufficiently larger than the rigidity of the tool 5, with the center of rotation 23 positioned on the machining point group A—A as in the situation (a), the accuracy of the configuration of the involute curve line does not deteriorate. However, when the rigidity of the spindle primary-axis portion 6, the rigidity of the work-piece 1 or the rigidities of the others is not sufficiently larger than the rigidity of the tool 5, an ideal position of the center of rotation 23 is slightly off the machining point group A—A. The amount of the deviation, considering a machining accuracy to be obtained, may be sufficient if the amount is half the diameter of the tool at maximum.

Even if an ideal position of the center of rotation is known, the pin 21 defining the center of rotation of the B-axis may be displaced in some cases. A problem as this occurs is a deviation particularly in the X-axis direction. However, a positional deviation of the pin 21 in the X-axis direction, as long as the squareness between the pin 21 and the spindle primary-axis base 17 is maintained at a high accuracy, can be canceled out by including correction of a deviation in the X-axis direction in advance in a machining program of an NC processor machine. Hence, despite a deviation of the pin 21 in the X-axis direction, if the deviation is within a predetermined range, it is possible to obtain a predetermined precise involute configuration and achieve the squareness at a high accuracy.

The predetermined range above, for correction of a deviation in the X-axis direction by means of a machining program or the like, may be a range up to half the diameter of the tool, so that the correction is possible and a high accuracy is obtainable wherever the center of rotation 23 of the B-axis may be.

Eleventh Embodiment

Figure 21:
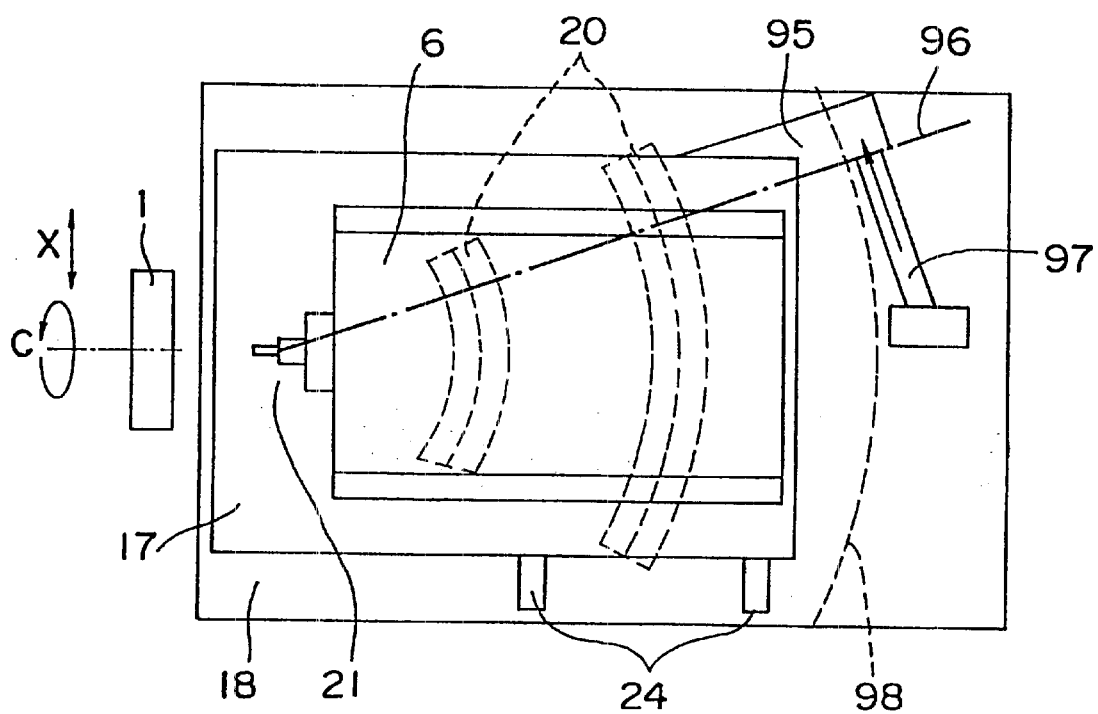
FIG. 21 is a plan view of an apparatus according to a further preferred embodiment of the present invention, wherein a drive force transmitting direction is a tangent direction.

An eleventh preferred embodiment of the present invention is described with reference to FIG. 21. The eleventh preferred embodiment is directed to drive transmission for rotating the spindle primary-axis portion about the B-axis, in the scroll machining systems shown in FIGS. 5 through 13 comprising a mechanism where the spindle primary-axis portion rotates about the B-axis. In FIG. 21, for rotating the spindle primary-axis portion 6 about the B-axis, it is necessary to provide drive force in the direction of the rotation. For efficient transmission of the drive force, an action plate 95 attached to the spindle primary-axis base 17 is arranged on a radial axis 96, and a direct acting actuator 97, such as a piezoelectric element, is arranged vertically to the radial axis 96 yet in the direction of a tangential line to a circular arc of revolution 98. With such an arrangement, since drive force acts in the direction of the tangential line to a circle about the B-axis, the spindle primary-axis portion rotates efficiently. Other mechanisms for rotation and a feedback method are the same as in the other preferred embodiments. Hence, when a range of revolution is narrow and it is possible to pivotally drive the action plate 95 using the direct acting actuator 97, to use such a direct acting actuator is less expensive and realizes a compact size than to use a rotating actuator.

Twelfth Embodiment

Figure 22:
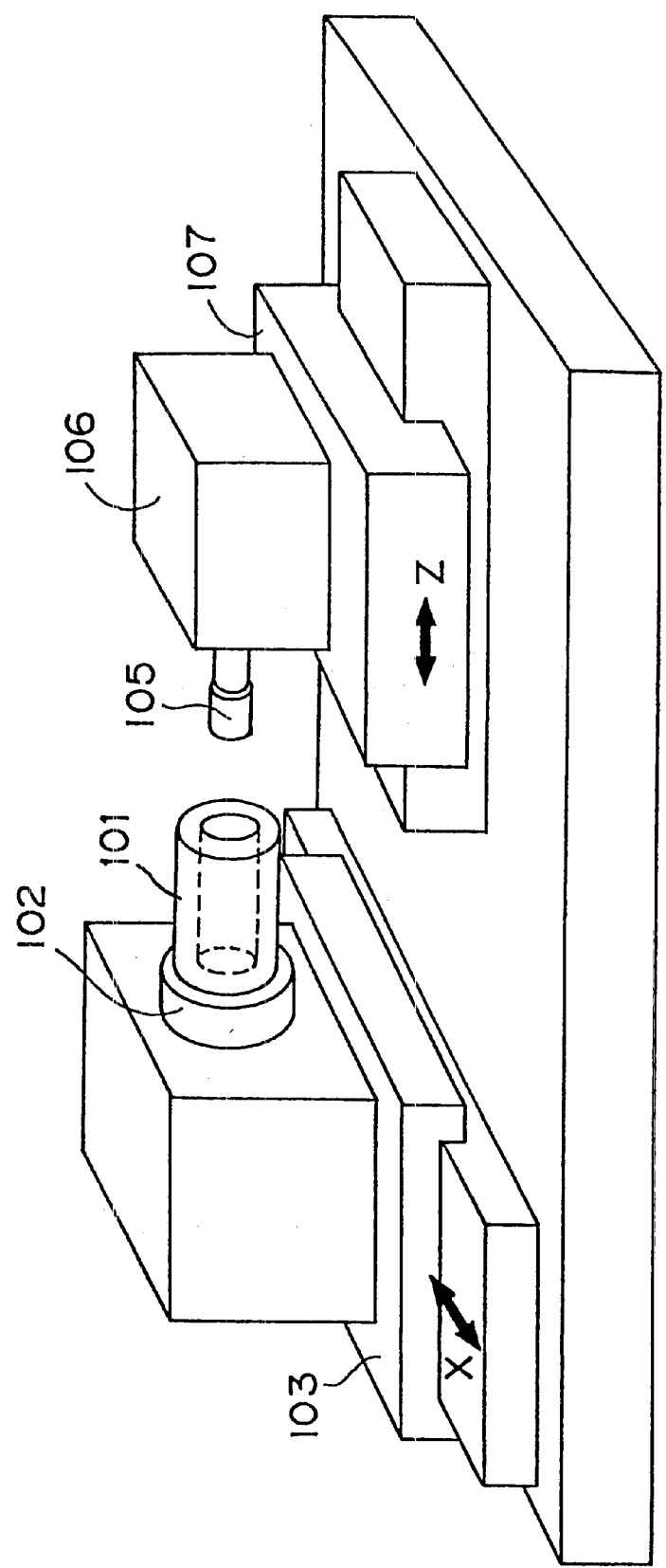
FIG. 22 is a perspective view of a conventional internal grinder.

A twelfth preferred embodiment of the present invention is described, which applies the mechanism for correcting the angle of the machining axis according to the present invention to an internal grinder. FIG. 22 is a perspective view of a typical internal grinder. This internal grinder comprises a work spindle 102 for rotating a cylindrical work-piece 101, an X-axis table 103 movable in the direction perpendicular to a central axis of the work-piece (X-axis direction), a spindle primary-axis portion 106 for rotating a tool 105, and a Z-axis table 107 traversing in the direction of an axis of the work-piece 101 (Z-axis direction). During machining, the work-piece 101 and the tool 105 are rotated, and while cutting into an internal surface of the work-piece 101 toward outside in a radius direction (X-axis direction) by the X-axis table 103, the tool 105 is caused by the Z-axis table to traverse in the axial direction of the work-piece 101 (Z-axis direction).

Figure 23:
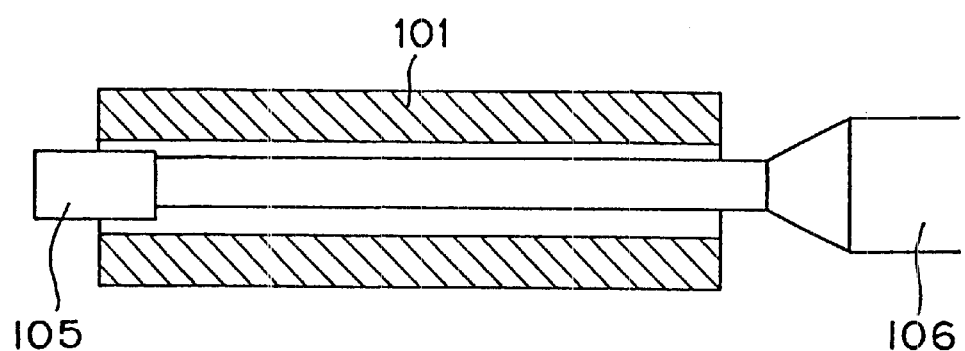
FIG. 23 is an explanatory diagram showing a relationship between a work-piece with a long hole and a grindstone of the internal grinder.

Machining of the cylindrical work-piece 101 shown in FIG. 23 using this machining system customarily leads to a phenomenon that since the tool 105 warps, as the tool 105 moves in the Z-axis direction (from the right to the left in FIG. 23), the diameter of the processed cylindrical inside surface tapers out and the cylindricity drops down. To deal with this, the grinder shown in FIG. 22 is used as a base machine, a mechanism shown in FIGS. 5 through 13 is mounted on the Z-axis table 107, and based on a method shown in FIGS. 14 through 19, a revolution volume of the spindle primary-axis base about the B-axis is corrected and controlled in or after the process, whereby an objective configuration is obtained at a high accuracy.

In addition, a positional deviation of the B-axis decreases the machining accuracy of a long hole in the form of a cylinder. To prevent this, it is necessary to properly arrange the B-axis. In a similar manner to that described in relation to the tenth preferred embodiment, the B-axis located at the center of rotation of the spindle primary-axis base as in the tenth preferred embodiment must be arranged on or in the vicinity of a machining point group. However, as described in relation to the tenth preferred embodiment earlier, even with the center of rotation deviated, using a base machine capable of machining while bi-axially controlling along the X-axis and the Z-axis, it is possible to correct a deviation in the X-axis direction by means of a machining program. This makes it possible to highly accurately process a circle, a flat surface and a cylinder.

Further, in a grinding machining system comprising a mechanism where the spindle primary-axis portion rotates about the B-axis, with the direction for transmitting drive force to drive the rotation about the B-axis arranged in a tangential direction to the rotation about the B-axis as described in relation to the eleventh preferred embodiment, it is possible to transmit the drive force efficiently.

Thirteenth Embodiment

Figure 24:
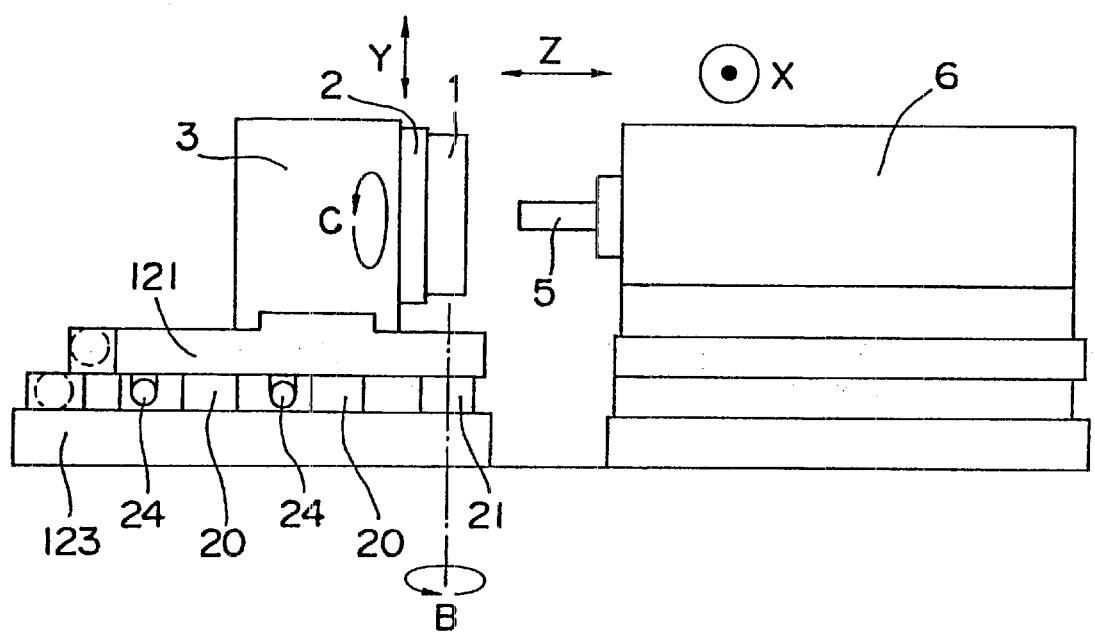
FIG. 24 is a side view of a machining system according to a still further preferred embodiment of the present invention.

A thirteenth preferred embodiment of the present invention is described with reference to FIG. 24. In the preferred embodiments described above, the relative rotation about the B-axis between the work-piece and the spindle primary-axis portion is realized by rotating the rotation axis of the spindle primary-axis portion relative to the fixed rotation axis of the work spindle. In the thirteenth preferred embodiment, the rotation axis of the work spindle is rotated relative to the fixed rotation axis of the spindle primary-axis portion.

As described earlier, the center of the B-axis of the relative rotation is located on a machining point group or offset from the machining point group by an amount equal to the radius of the tool at maximum, and the B-axis and the machining points should not move relative to each other during machining. In the preferred embodiments above regarding machining of a scroll blade, since feeding in the X-axis direction is realized by movement of the spindle primary-axis portion, the rotation mechanism for rotating about the B-axis is disposed to the spindle primary-axis base, to thereby avoid the relative movement above.

In the thirteenth preferred embodiment, an X-axis direction feed mechanism is disposed to a work-piece base, and thereby it is possible to prohibit relative movement between the B-axis and the machining points despite rotation of the work-piece about the B-axis. FIG. 24 shows the mechanism, in which the work-piece base 3 is disposed to a work-piece base seat 121. In addition, the work-piece base 3 is supported on the work-piece base seat 121 in such a manner that the work-piece base 3 is movable in the X-axis direction (a direction perpendicular to FIG. 24). Movement of the work-piece base 3 in the X-axis direction achieves feeding in the X-axis direction which is necessary during machining. With respect to the work-piece base seat 121, as in the preferred embodiments described above, the rotation guide 20 supporting the work-piece base seat 121 for free rotation about the B-axis is disposed between the work-piece base seat 121 and a base plate 123 supporting the work-piece base seat 121 from below, so that it is possible to rotate the work-piece base seat 121 any necessary amount. With this structure, even when the work-piece 1 and the tool 5 move relative to each other in the X-axis direction as the machining progresses, the B-axis and the machining points do not move relative to each other. The drive mechanism and the control mechanism may be exactly the same as those according to the preferred embodiments described above requiring to rotate the spindle primary-axis portion.

An advantage of thirteenth preferred embodiment is that since the work-piece base lighter than the spindle primary-axis base is rotated, it is possible that the rotation mechanism has a small size in a machining system or the like comprising a plurality of spindle main axes. Further, during scroll machining, it is possible to perform bi-axial control of rotation about the C-axis (the rotation axis of the work-piece) and feeding in the X-axis direction by means of the work-piece base 3, which in turn allows easy management of the accuracy.

In order to apply this structure to an internal grinding machining system, it is necessary to remove relative movement between the B-axis and the machining points. Using the grinding machining system shown in FIG. 22, for instance, the Z-axis direction feed mechanism may be shifted to a work-piece base 103 from a spindle primary-axis base 107, and therefore, such relative movement can be removed.

Fourteenth Embodiment

A fourteenth preferred embodiment of the present invention is described. With respect to scroll machining, the foregoing has described to process a scroll groove by moving the tool 5 in the X-axis direction while rotating the work-piece 1. In this case, since the tool 5 and the work-piece 1 warp only in one direction (X-axis direction), correction in this direction may be provided about the B-axis (an axis parallel to the Y-axis). As other scroll machining method, a scroll groove may be formed by moving the work-piece 1 and the tool 5 relative to each other in the X-axis and the Y-axis directions instead of rotating the work-piece 1. In this case, since the tool 5 and the work-piece 1 warp in the Y-axis direction as well in addition to the X-axis direction, for the purpose of correcting the warpage, relative rotation between the work-piece 1 and the tool 5 about an A-axis (an axis parallel to the X-axis) is necessary additionally to the relative rotation about the B-axis (an axis parallel to the Y-axis).

This may be achieved if similar mechanisms to the rotation mechanism, the drive mechanism and the control mechanism described above about the B-axis are added for rotation about the A-axis. This requires to support the weight of the mechanisms of the movable parts as a whole. However, with rotation restricted by the rotation guide 20 to prevent relative movement between the rotation axis and the machining points and with the spindle primary-axis base or the work-piece base driven by an actuator 49 such as the piezoelectric elements 22, it is possible to directly apply the concept described above. Further, while the structure is complex due to addition of a rotation mechanism about the A-axis to the rotation mechanism about the B-axis, as in the previous preferred embodiment described above, for example, with a movable mechanism disposed to the work-piece base as well additionally to the movable mechanism disposed to the spindle primary-axis base so that the work-piece base and the spindle primary-axis base respectively realize the rotation about the A-axis and the rotation about the B-axis or vice versa, it is possible to moderate the complexity of the structure.

While the preferred embodiments described above are directed to scroll machining, the concept of moving the work-piece base and the spindle primary-axis base relative to each other about the two axes of the A-axis and the B-axis may be applied directly to other machining. The application to cutting and grinding of a long hole according to the preferred embodiments described earlier is one example. Other than this, it is possible to improve the accuracy by means of correction using the bi-axial relative rotation where the direction of warping of the tool and/or the work-piece is not a constant one direction. That is, using a rotation mechanism for relative rotation about two axes, it is possible to correct warping of the tool and/or the work-piece in all directions. While control apparatuses for this may be disposed each for each one of the rotation axes for the relative rotation, controlling in a bi-axial simultaneous manner with integration of such control apparatuses is more efficient.

While the foregoing has described the precision machining system according to the present invention in relation to the various preferred embodiments with reference to the associated drawings, the present invention is not limited to these preferred embodiments. For instance, while the tool described in relation to the preferred embodiments above is effective for cutting and grinding, a similar effect is obtainable by means of other tools in general used for a machining method where reaction force is developed. In addition, it is needless to mention that the angular correction of the machining axis is applicable not only to correction of distortion induced by reaction force of a machining resistance or the like but to correction due to other causes, such as reproducible thermal distortion.

In the machining system according to the present invention, the tool is subjected to a machining resistance in one direction and the tool and the work-piece warp in one constant direction. Because of this, a direction for correcting the spindle primary-axis portion is a uni-axial direction, which in turn allows easy correction of the amount of warpage of the tool and the amount of warpage of the work-piece. The machining system according to the present invention realizes the correction by means of relative rotation between the rotation axis of the work spindle and the rotation axis of the spindle primary-axis portion of the tool. Hence, with the machining system comprising such a mechanism, it is possible to precisely process a right angle, parallel surfaces and a cylinder in a scroll blade, for example.

Where the tool and the work-piece warp in two directions, the spindle primary-axis portion as well is corrected in the two direction, whereby a similar effect is obtained. In addition, it is also possible to correct warping of the tool and the work-piece in all directions. Further, with correction in one of the two directions realized by driving the work-piece base and correction in the other one of the two directions realized by driving the spindle primary-axis portion, the complexity of the apparatus is removed.

Since the rotation about the B-axis is controlled in or after the process based on a variation in machining load due to a scroll configuration, it is possible to freely control the configuration of a work-piece in the axial direction of the tool. Further, during machining of a long hole, it is possible to freely control the configuration of a work-piece in the axial direction of the tool.

As a deviation in the X-axis direction due to the rotation about the B-axis is corrected in a machining program, during machining of a scroll blade, it is possible to prevent a decrease in accuracy of an involute configuration. Further, it is also possible to process a long hole at a high accuracy.

Moreover, with the direction for transmitting drive force driving the rotation about the B-axis arranged in the tangential direction to the rotation about the B-axis, it is possible to efficiently transmit the drive force to the spindle primary-axis base or the work-piece base to be driven. Since this permits smooth movement, it is possible to highly accurately process inexpensively at a high speed.

The relative rotation between the work-piece base and the spindle primary-axis base about the B-axis may be realized not only by driving and rotating the spindle primary-axis base but by driving and rotating the work-piece base as well. This reduces the size of the rotation mechanism, enhances the machining accuracy of a scroll blade, and increases the flexibility of the apparatus layout.

What is claimed is:

1. A machining system machining a work-piece by means of relative movement between a held work-piece and a tool held by a tool holder at a position facing said work-piece to rotate in a predetermined manner, characterized in that:

said machining system having a Z-axis in the direction of depth of an internal wall of said workpiece, an X-axis perpendicular to said Z-axis and in the direction for feeding said tool, a Y-axis perpendicular to said Z-axis and said X-axis, and a work-piece C-axis parallel to said Z-axis, said work-piece and said tool are movable relative to each other about at least two axes of said X-axis and said Z-axis, regarding at least the two axes about which said relative movement is possible, said relative movement between said work-piece and said tool can be controlled simultaneously, whereby a machining resistance is created between the work-piece and the tool during a machining operation;

said work-piece and said tool holder rotate relative to each other about a pivot axis of rotation in response to a detected change in the machining resistance to thereby correct any machining error, and the pivot axis of rotation does not move relative to a machining point.

2. The machining system of claim 1, wherein relative rotation between said work-piece and said rotation axis of said spindle primary-axis portion for correction of said machining error is relative rotation about two axes which are an A-axis parallel to said X-axis and a B-axis parallel to said Y-axis.

3. The machining system of claim 2, wherein of said relative rotation about the two axes of said A-axis and said B-axis, said work-piece is driven in said relative rotation about one of the two axes, while said spindle primary-axis portion is driven in said relative rotation about the other one of the two axes.

4. The machining system of claim 1, wherein the relative rotation between the work-piece and the tool holder has a resolution within seconds (angles).

5. A machining system for machining a scroll blade the system comprising:

a scroll blade holding spindle, rotatable in a predetermined manner, at least one tool on at least one tool holder facing the scroll blade, said machining system having a first axis defining the direction for feeding said tool, a second axis perpendicular to said first axis and a third axis perpendicular to said first axis and said second axis, said scroll blade holding spindle and said tool are movable relative to each other about at least said first axis and said second axis, simultaneous control of relative movement in the direction of said second axis and rotation about an axis of said scroll blade which is parallel to said first axis, whereby a machining resistance is created between the work-piece and the tool during a machining operation;

said scroll blade holding spindle and said tool holder rotate relative to each other about a B-axis, which is an axis parallel to said third axis, in response to a detected change in the machining resistance to thereby correct any machining error, and said B-axis does not move relative to a machining point even when said scroll blade and said tool move relative to each other.

6. The machining system of claim 5, further comprising:

a rotation guide disposed between a primary-axis base where said spindle primary-axis portion is fixed and a base plate supporting said primary-axis base, and supporting said primary-axis base so as to rotate about said B-axis;

an actuator providing rotational drive force about said B-axis to said primary-axis base supported by said rotation guide;

a sensor monitoring a revolution volume about said B-axis;

a data storage portion including a reference value of said revolution volume; and a feedback circuit controlling said revolution volume based on data included in said data storage portion.

7. The machining system of claim 6, wherein said actuator providing the rotational drive force to said spindle primary-axis base is a piezoelectric element or a magnetostrictive element.

8. The machining system of claim 6, wherein said actuator providing the rotational drive force to said spindle primary-axis base is a feed screw mechanism driven by rotation of a motor.

9. The machining system of claim 6, wherein said actuator providing the rotational drive force to said spindle primary-axis base is a cam mechanism driving and rotating with a motor.

10. The machining system of claim 6, wherein said data storage portion including said reference value of said revolution volume includes a machining error correction volume, which is a revolution volume about said B-axis, at each machining position, and said machining error correction volume is compared with said data and calculated based on an X-coordinate value signal received from a processor main unit to thereby control a revolution volume of relative rotation between said rotation axis of said scroll blade holding spindle and said rotation axis of said spindle primary-axis portion.

11. The machining system of claim 6, wherein said data storage portion including said reference value of said revolution volume includes a machining error correction volume, which is a revolution volume about said B-axis, after an elapsed time since the start of each machining, and said machining error correction volume is compared with said data and calculated using a machining start signal received from a processor main unit as a starting point to thereby control a revolution volume of relative rotation between said rotation axis of said scroll blade holding spindle and said rotation axis of said spindle primary-axis portion.

12. The machining system of claim 6, wherein said data storage portion including said reference value of said revolution volume includes an amount of distortion of said tool corresponding to a motor current of said spindle primary-axis portion and a corresponding machining error correction volume, which is a revolution volume about said B-axis, and a result of in-process monitoring of said motor current of said spindle primary axis portion is compared with said data and calculated to thereby control a revolution volume of relative rotation between said rotation axis of said scroll blade holding spindle and said rotation axis of said spindle primary-axis portion.

13. The machining system of claim 6, wherein said data storage portion including said reference value of said revolution volume includes an amount of distortion of said tool corresponding to an angle of twist of said tool or said rotation axis of said spindle primary axis portion and a corresponding machining error correction volume, which is a revolution volume about said B-axis, and a result of in-process monitoring of said angle of twist of said tool or said rotation axis of said spindle primary axis portion is compared with said data and calculated to thereby control a revolution volume of relative rotation between said rotation axis of said scroll blade holding spindle and said rotation axis of said spindle primary-axis portion.

14. The machining system of claim 6, wherein said data storage portion including said reference value of said revolution volume includes an amount of distortion of said tool corresponding to power of said spindle primary-axis portion and a corresponding machining error correction volume, which is a revolution volume about said B-axis, and a result of in-process monitoring of said power of said spindle primary-axis portion is compared with said data and calculated to thereby control a revolution volume of relative rotation between said rotation axis of said scroll blade holding spindle and said rotation axis of said spindle primary-axis portion.

15. The machining system of claim 10, wherein said work-piece processed based on the comparison with said data included in said data storage portion is measured at a predetermined frequency, and said data included in said data storage portion are updated sequentially based on a result of the measurement.

16. The machining system of claim 6, further comprising means for correcting relative rotation about B-axis between said rotation axis of said scroll blade holding spindle and said rotation axis of said spindle primary-axis portion and additionally for correcting an error in the direction of said X-axis caused by displacement of the center of the rotation about said B-axis from said spindle primary-axis portion, for the purpose of correcting warping of said tool due to said machining resistance.

17. The machining system of claim 5, wherein said central axis of said relative rotation about said B-axis between said rotation axis of said scroll blade holding spindle and said rotation axis of said spindle primary-axis portion is arranged on a machining point group or offset from said machining point group by an amount within the radius of said tool.

18. The machining system of claim 6, wherein a direction in which the rotational drive force during said relative rotation about said B-axis between said rotation axis of said scroll blade holding spindle and said rotation axis of said spindle primary-axis portion is transmitted is the direction of a tangential line to a circle about said B-axis.

19. The machining system of claim 5, wherein said mechanism driving and controlling said relative rotation about said B-axis between said rotation axis of said scroll blade holding spindle and said rotation axis of said spindle primary-axis portion is disposed to a work-piece base seating said work spindle, and said rotation axis of said scroll blade holding spindle is rotated about said B-axis relative to said rotation axis of said spindle primary-axis portion.

20. The machining system of claim 5, wherein the relative rotation between the scroll blade holding spindle and the rotation axis of the spindle primary-axis portion has a resolution within seconds (angles).

21. A machining method for performing internal grinding on an internal surface of a cylindrical work-piece held by a work spindle, the method comprising:

rotating the cylindrical work-piece in a predetermined manner about a rotation axis of the work spindle, grinding the cylindrical work-piece using a grinding tool held by a tool holder at a position facing said work-piece while rotating the grinding tool about a rotation axis of the tool holder in a predetermined manner, by relative movement of the cylindrical work-piece and the grinding tool in an axis perpendicular to said rotation axis of the work spindle and in the radius direction of said cylinder, whereby a machining resistance is created between the work-piece and the grinding tool during the grinding;

rotating said work spindle and said tool holder relative to each other about a pivot axis of rotation in response to a detected change in the machining resistance to thereby correct any machining error, and wherein said pivot axis of rotation does not move relative to a machining point even when said work-piece and said tool move relative to each other.

22. The machining method of claim 21, wherein the relative rotation between the work spindle and the rotation axis of the spindle primary-axis portion has a resolution within seconds (angles).

23. A machining system for machining a work-piece, the system comprising:

a workpiece holding spindle, rotatable in a predetermined manner, a tool on a tool holder arranged at a position facing the work-piece, said machining system having a Z-axis defining the direction for feeding said tool, an X-axis perpendicular to said Z-axis, a Y-axis perpendicular to said Z-axis and said X-axis, and a work-piece C-axis parallel to said Z-axis, said work-piece holding spindle and said tool are movable relative to each other about at least said X-axis and said Z-axis, regarding at least the two axes about which said relative movement is possible, said relative movement between said work-piece holding spindle and said tool can be controlled simultaneously, whereby a machining resistance is created between the work-piece and the tool during a machining operation;

said work-piece holding spindle and said tool holder rotate relative to each other about a pivot axis of rotation in response to a detected change in the machining resistance to thereby correct any machining error, and the pivot axis of rotation does not move relative to a machining point.

24. The machining system of claim 23, wherein relative rotation between said work-piece holding spindle and said tool holder in response to said machining error is relative rotation about two axes which are an A-axis parallel to said X-axis and a B-axis parallel to said Y-axis.

25. The machining system of claim 24, wherein of said relative rotation about the two axes of said A-axis and said B-axis, said work-piece holding spindle is driven in said relative rotation about one of the two axes, while said spindle primary-axis portion is driven in said relative rotation about the other one of the two axes.

26. The machining system of claim 23, wherein said relative rotation between said work-piece holding spindle and said tool holder can be controlled to within seconds (angle).

* * * * *